US009619445B1

(12) United States Patent
Neuberg et al.

(10) Patent No.: US 9,619,445 B1
(45) Date of Patent: Apr. 11, 2017

(54) CONVERSION OF CONTENT TO FORMATS SUITABLE FOR DIGITAL DISTRIBUTIONS THEREOF

(71) Applicant: Inkling Systems, Inc., San Francisco, CA (US)

(72) Inventors: Bradley Keith Neuberg, San Francisco, CA (US); Varun Arora, Pittsburgh, PA (US); Peter Sungil Cho, San Francisco, CA (US); Dana Dowling Lindsay, San Francisco, CA (US); Yi Liu, Los Altos Hills, CA (US); Olof Alexander Mathé, San Francisco, CA (US); Nolan Shea Myers, San Francisco, CA (US); David Matthew Rau, San Francisco, CA (US); Geoffry Thomas Svacha, Oakland, CA (US); Chanpory Rith, San Francisco, CA (US)

(73) Assignee: Inkling Systems, Inc., San Francisco, CA (US)

( * ) Notice: Subject to any disclaimer, the term of this patent is extended or adjusted under 35 U.S.C. 154(b) by 264 days.

(21) Appl. No.: 13/973,931

(22) Filed: Aug. 22, 2013

Related U.S. Application Data

(60) Provisional application No. 61/692,653, filed on Aug. 23, 2012.

(51) Int. Cl.
*G06F 17/21* (2006.01)
*G06F 17/22* (2006.01)
*G06F 17/24* (2006.01)

(52) U.S. Cl.
CPC ........ *G06F 17/2247* (2013.01); *G06F 17/211* (2013.01); *G06F 17/24* (2013.01)

(58) Field of Classification Search
CPC ..... G06F 17/2247; G06F 17/24; G06F 17/211
See application file for complete search history.

(56) References Cited

U.S. PATENT DOCUMENTS

| 5,953,525 | A | * | 9/1999 | Glaser et al. | 717/105 |
|---|---|---|---|---|---|
| 7,607,085 | B1 | * | 10/2009 | Lassesen | 715/264 |
| 2001/0056460 | A1 | * | 12/2001 | Sahota et al. | 709/201 |
| 2002/0065814 | A1 | * | 5/2002 | Okamoto et al. | 707/3 |
| 2004/0010753 | A1 | * | 1/2004 | Salter et al. | 715/513 |
| 2006/0253466 | A1 | * | 11/2006 | Upton | 707/100 |
| 2008/0052616 | A1 | * | 2/2008 | Kano et al. | 715/236 |
| 2009/0187530 | A1 | * | 7/2009 | Nair et al. | 707/1 |
| 2010/0077320 | A1 | * | 3/2010 | Lepore et al. | 715/760 |
| 2013/0019182 | A1 | * | 1/2013 | Gil et al. | 715/738 |

* cited by examiner

*Primary Examiner* — Stephen Hong
*Assistant Examiner* — Hope C Sheffield
(74) *Attorney, Agent, or Firm* — Ascenda Law Group, PC

(57) ABSTRACT

Embodiments are provided for conversion of content to formats suitable for digital distributions. In some embodiments, a transformation of selected markup elements within a content item into semantic markup elements is performed, where the transformation provides receipt of a selection indicative of a mapping between a chosen markup element and a pattern element of a defined pattern, the defined pattern defining at least one of a semantic markup tag and a semantic attribute for each pattern element, and processing of the transformation by assigning to the chosen markup element at least one of a semantic markup tag and a semantic attribute defined for the pattern element mapped to the chosen markup element.

6 Claims, 22 Drawing Sheets john_doe_13e/.../chapter01.xhtml:

p.bunch → chapter
p.bun-tt  1
span.char-style-override-2
Maecenas Mattis
Elementum Orci A
p.quote  In at lorem vel tellus consequat viverra. Sed eget erat sed turpis venenatis dapibus non ut leo. Proin in ante nulla, sed facilisis elit. Suspendisse potenti. Ut velit tellus, auctor nec varius et, volutpat a quam. Pellentesque adipiscing erat sed leo pellentesque vulputate.
p.quote-author  Mary Doe, Feb. 24, 2004

24

🔍 12 matches: p.bun-ch + p.bun-tt chapter 1 p40
chapter
1 chapter 2 p40
chapter
2 chapter 3 p40
chapter
3 chapter 4 p40
chapter
4 chapter 5 p40
chapter
5 chapter 6 p40
chapter
6 chapter 7 p40
chapter
7 chapter 8 p40
chapter
8

SELECT CONTENT p.bun-ch — chapter p.bun-tt — 1 p.bun-tt — Maecenas Mattis span.char-style-override-2 — Elementum Orci A p.quote — In at lorem vel tellus consequat viverra. Sed eget erat sed turpis venenatis dapibus non ut leo. Proin in ante nulla, sed facilisis elit. Suspendisse potenti. Ut velit tellus, auctor nec varius et, volutpat a quam. Pellentesque adipiscing erat sed leo pellentesque vulputate.

p.quote-author — Mary Doe, Feb. 24, 2004

CONVERSION OF CONTENT TO FORMATS SUITABLE FOR DIGITAL DISTRIBUTIONS THEREOF

CROSS-REFERENCE TO RELATED APPLICATIONS

This application claims the benefit of U.S. Provisional Patent Application No. 61/692,653 filed Aug. 23, 2012, the disclosure of which is incorporated herein by reference in its entirety.

FIELD OF THE INVENTION

Various embodiments relate to converting content to formats suitable for use in connection with digital distributions of the content.

BACKGROUND

Software tools, such as InDesign™, produced by Adobe Systems Incorporated of San Jose, Calif., are commonly used in the publishing industry to create a variety of print media-based items such as books, magazines, flyers, brochures, etc. These tools allow designers and editors to create containers into which the content (e.g., text, images, vector objects, etc.) is introduced. Stories (defined by the various content items) then flow across containers. The collection of containers and their arrangement defines the layout of the book, magazine or other item being created.

Tools such as InDesign support multiple output formats, for example Adobe's portable document format (pdf) and flash format (swf), including even some proprietary or third party markup language formats (e.g., InDesign markup language (IDML)) and electronic publication formats. However, it remains the case that all or virtually all of the outputs provided by these software tools are provided with a print media representation for the content layout in mind. That is, even the markup language or electronic publication files produced by the tools are created based on visual representations of the content on a plane (such as a page) and not in semantically meaningful ways that allow for reflowing, reordering, reorganizing and/or reorienting, etc., of the content when viewed on electronic devices such as desktop computer screens, laptop computer screens, smartphones, table computers, and the like.

SUMMARY

Embodiments are provided for conversion of content to formats suitable for digital distributions. In some embodiments, a transformation of selected markup elements within a content item into semantic markup elements is performed, where the transformation provides receipt of a selection indicative of a mapping between a chosen markup element and a pattern element of a defined pattern, the defined pattern defining at least one of a semantic markup tag and a semantic attribute for each pattern element, and processing of the transformation by assigning to the chosen markup element at least one of a semantic markup tag and a semantic attribute defined for the pattern element mapped to the chosen markup element.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which:

FIG. 2 is an exemplary user interface for conversion of content to formats suitable for digital distributions in accordance with some embodiments of the invention;

FIG. 3 is an exemplary user interface for conversion of content to formats suitable for digital distributions in accordance with some embodiments of the invention;

FIG. 7A is an exemplary user interface for conversion of content to formats suitable for digital distributions in accordance with some embodiments of the invention;

FIG. 8C is an exemplary user interface for conversion of content to formats suitable for digital distributions in accordance with some embodiments of the invention;

DETAILED DESCRIPTION

Figure 1A:
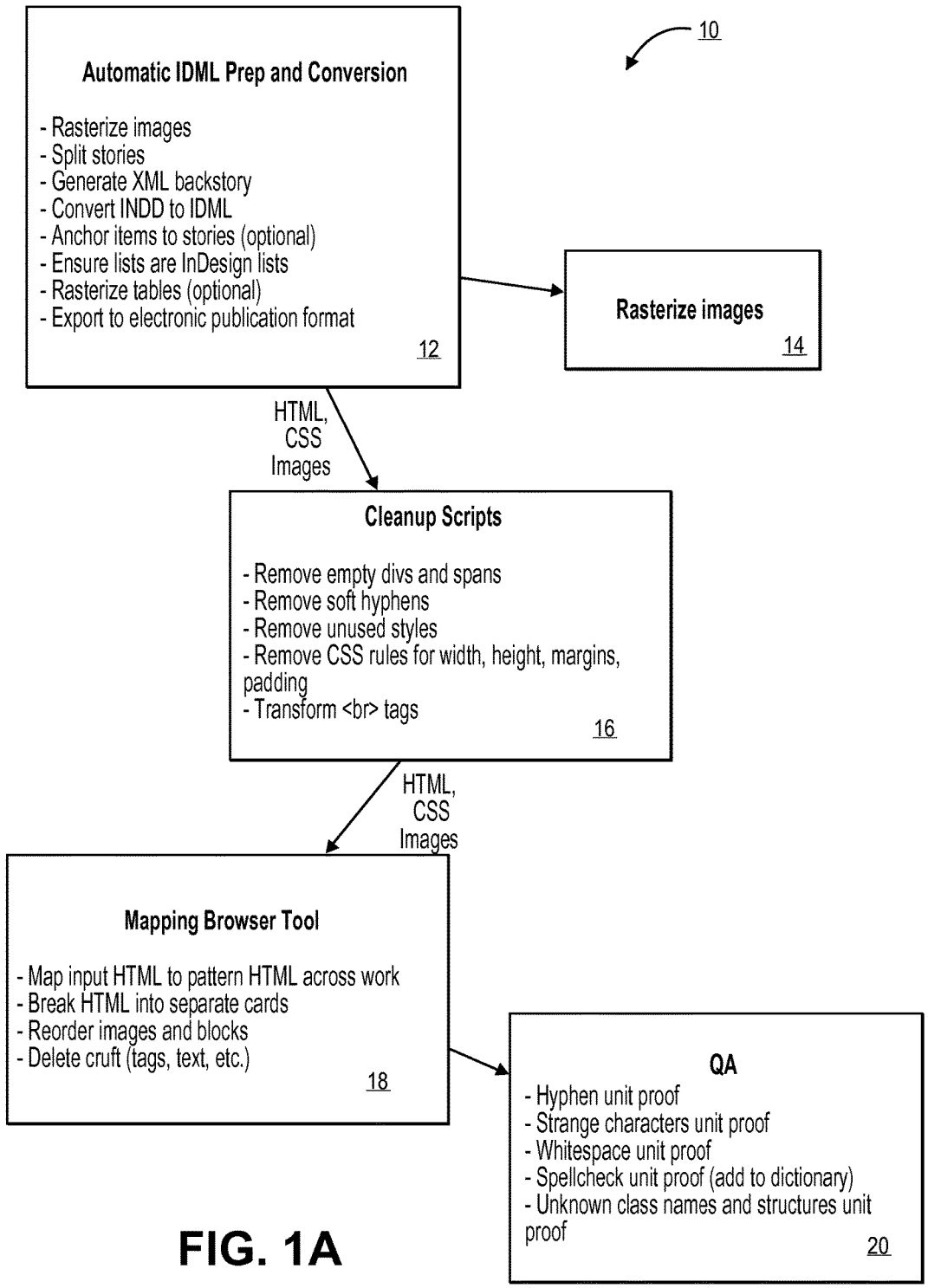
FIG. 1A is an exemplary flowchart depicting a process for conversion of content to formats suitable for digital distributions in accordance with some embodiments of the invention.

Methods, computer readable mediums, and systems for transforming document elements of a content item into semantically meaningful elements suitable for digital distribution are provided. A received content item may have document elements that are syntactically correct without conveying any meaning or semantics in regards to the content item and such elements may be transformed to produce a content item with semantically meaningful elements. In particular, some embodiments convert content created by software tools, for example, by desktop publishing tools such as those discussed above, in formats intended for other uses (e.g., for use with print-based distributions of the content) to formats suitable for use in connection with digital distributions of the content (e.g., for consumption on electronic devices such as desktop computer screens, laptop computer screens, smartphones, table computers, and the like).

In some embodiments, a two-step procedure is performed. In the first step, the source files (e.g., in IDML, Extensible Markup Language (XML), or other format) of a content work (e.g., book, magazine, etc.) are converted and/or transformed into a high quality markup language file or files. For example, a high quality markup language file may have some semantic hypertext markup language (HTML) elements. In another example, the content may be converted into a lower quality markup language file that lacks semantic markup language elements. By semantic HTML we mean HTML code that reinforces the meaning of the information in the content work, rather than just defining its presentation. Cascading style sheets (CSS) can then be used to describe the presentation semantics (e.g., the look and formatting) of the content. The content may have some markup elements that are syntactically correct, but may not convey any meaning or semantics in regards to the content. In other embodiments, the content may be received in HTML with elements that may need to be transformed to semantically meaningful elements.

In the second step, a semi-automated pattern replication tool may be used to examine the markup language file(s), map elements thereof to desired, semantically meaningful tags, and automatically replicate those tag mappings across all (or a selected subset of) similar markup language element within the entire content work. The same tool may be used for other operations, for example:

- renaming of some or all of a number of selected tags;
- removal of tags and optionally retaining of selected tags' children (i.e., tags which are hierarchically related to those tags being removed);
- splitting occurrences of given tags and/or items between tags into their own new files;
- chunking (e.g., dividing into syntactically correlated or other portions) selected tags into their own new files; and
- re-parenting selected tags (e.g., those for which previous hierarchical parents have been removed).

The result is a high quality markup language file, with elements thereof tagged with semantically meaningful tags that are suitable for use in connection with digital distributions of the content work.

FIG. 1A is an exemplary flowchart depicting a process 10 for conversion of content to formats suitable for digital distributions in accordance with some embodiments of the invention. For simplicity of discussion, works may be referred to as being composed of a single file, however, it should be understood that a single content work (e.g., a content item) may be represented in a number of electronic files. Beginning with a source file for the content work, that source file may exist in a format suitable for a print media layout as produced by a software tool (e.g., InDesign, Microsoft Word, etc.). In other embodiments, the source file may be in XML, HTML, and/or any other format or combination thereof with document elements for transformation to semantically meaningful elements.

In some embodiments, the source file has some regularity, in the sense that styles or other treatments are applied universally and/or applied to similar elements of the content item, or at least partially so, across the work. For example, first level headings within the work may be treated in a "regular" fashion through application of the same font style, size, etc. By way of further example, first level headings may be applied to similar elements (e.g., elements within the content item entitled "p.bun-ch") within the content item. These regularities (styles) are converted and information regarding the same may be conveyed along with the content that makes up the source file(s) as the files are processed and mapped. The browser-based mapping tool described herein allows discovery or identification of this regularity and use it to impose transformations of similar elements across the work in a consistent fashion.

The source file may optionally be prepared for transformation in accordance with some embodiments by ensuring that objects are anchored to their respective stories (e.g., their respective textual descriptions). Anchored objects are items, such as images, text boxes, etc., which are attached—or anchored—to specific text. The anchored object travels with the text containing the anchor as the text reflows. In other instances, no such preparation is needed. Instead, automated processes (discussed further below) are employed to determine where images and other objects should be positioned relative to text in order to provide a desirable user experience when reading the work. As a result, manual anchoring of such objects is not required.

List items in the source file may receive special attention because although proprietary document elements (e.g., elements provided in InDesign) may appear to create lists as markup language objects, in fact the mappings are sometimes visual rather than semantic in nature, depending on the quality of the input file. That is, by way of example, the IDML elements that describe a list can do so in a manner that represents a visual layout and not a hierarchical or other semantically meaningful one. Consequently, during the conversion the visual mappings will have to be parsed and recognized as describing relationships of items, which relationships will need to be translated to semantically meaningful descriptions. This may involve pattern matching-that is, recognizing visual clues that define lists and ordering the content elements accordingly. Tables that are present in the source file are likewise sometimes represented in a visual manner in some source files, hence, they may need to be rasterized in order to preserve tabular relationships in the file after conversion. In other instances, tables may be interpreted in their native (non-rasterized) form.

At 12, the source file is converted from a format suitable for print distribution (e.g., IDML, XML, etc.) to HTML (or another markup language). The conversion is done so that unanchored items are automatically positioned within the story flow while anchored items remain connected to their context within that flow. As indicated above, list-like objects are converted to HTML lists, so that visual representations are replaced by semantic representations using HTML tags. For example, where source list items appear to be prefaced by numerals, letters, or other designations of sequence, etc., those list items may be described by ordered list tags in the resulting HTML. Likewise, list items that appear to be prefaced by bullets or other non-sequential designators may be described by unordered list tags in the resulting HTML. Basic styling and colors are also exported during this procedure and image objects are rasterized 14 for later inclusion in the digital content work.

Other processes undertaken in the context of the conversion include normalization of spread coordinate systems (which includes taking each component of a "spread" that has absolute positioning based on the coordinate system it belongs to, and normalizing it with respect to an ancestor spread, thus being able to establish relationships between all the elements on the page); ordering of items on a page (text blocks, images, tables, etc.) in a semantic representation and top-down flow (items in the source file will not have such a flow, but instead will have only absolute positions on a plane to which they belong); automatic image placement (described further below); and paragraph stitching (e.g., to preserve readability of the work by bringing together fragments of paragraphs which may have been "broken" due to their layout in the original work, but which should be presented in a continuous fashion when the work is in electronic form for consumption on an electronic reader device). In this latter instance, it should be recognized that the conversion from a paper-based medium to an electronic medium often requires a very different layout and organization of the content work be employed. Layouts for print-based media, based on page metaphors, may be, and often are, inappropriate for consumption of the content on an electronic platform. Therefore, when the content is being transformed, blocks of text that are intended to be continuous in nature (in terms of their contextual relation to one another) but which were separated across page boundaries and the like may need to be merged together in the semantic markup language version of the content. This process may be referred to as "proofing" wherein a computational "close read" of each paragraph takes place, to identify broken paragraphs that are then combined to produce a continuous story.

The resulting file will be a representation of the original source file, transcribed into HTML and CSS (cascading style sheets). The CSS describes the presentation (appearance and layout) of the content (e.g., by font type, size, color, etc.) and the HTML describes what the content is (e.g., a heading, paragraph, etc.). Together, the CSS and HTML represent computer-readable instructions for a browser or other software application to render the content included in the HTML file on a display or other presentation medium.

At 16, the HTML file undergoes a cleanup. This may involve an automated, or semi-automated, review of the file for elements such as empty divs (elements which define logical divisions in a file) and spans (elements which define styles to be applied to content), soft hyphens (positions where hyphens are permitted without forcing a line break when text is reflowed), unused styles, and other CSS layout rules, etc. and removing them from the file. This review and editing may be done in an automated fashion (e.g., using an HTML editor that can search for and replace or delete elements on a global or individual basis) and the results thereof presented for review by a human editor (e.g., to ensure it has been completed correctly). The review may occur as the cleanup process proceeds or after an entire work has been subjected to the cleanup.

Thereafter, the resulting HTML file is provided to a mapping tool 18. The mapping tool is configured to apply user-designated revisions to HTML tags and associated CSS class names across similar elements throughout the entire content work. For example, if while using the mapping tool, a user decides that a previously tagged content item should be reclassified as (or mapped to) a particular type of header (designated, for example, by <h2> . . . </h2>) and maps one such element, the tool will automatically look for all similar instances of content that was mapped under the original tags and convert them to be mapped under the new tags. In this way, by way of example, desired patterns for the content may be replicated and the changes are propagated/applied across the entire work without the user having to manually inspect each instance.

In addition to working with single tags, a user may select multiple tags that must form a matched grouping across the work. For example, if two tags, say tag A and tag B, are adjacent one another (i.e., the tags are "siblings") and the user selects both of them, all matches across the work that have exactly tag A and tag B adjacent one another will be selected. These kinds of actions may also apply in the case of parent-child tags, grandparent-parent-child tags, and so on.

For complex patterns, such as figures, headers, etc., a user may select a target container tag and may perform individual mappings inside that container tag (e.g., to map pieces of the pattern, such as the figure caption, etc.). One may also be provided the ability to set options that do not map to things, such as specifying the layout for a figure, etc. When applying this complex pattern, the given container tag and those items mapped with it run across shadow selections (described below) to transform everything that matches into the given complex pattern.

In effect, the mapping tool can be regarded as performing the task of grouping similar content items within common architectural elements so that they can be identified and, ultimately, rendered in a similar manner. In the past, this was a very labor-intensive process because each content item would have to be manually inspected and mapped to its desired HTML tags. This required editors to continually refer back to layout specifications so as to ensure that common design themes were replicated throughout a work. The present invention greatly simplifies (or, perhaps better stated, amplifies the effect of) the editor's work inasmuch as style and other choices for single instances of content items can be immediately replicated across all (or a selected subset of) such content items within the content work. The mapping tool thus takes into account the "regularities" present (albeit hidden from readers) in source files (as discussed above) and exploits them as hooks in the amplification process.

The mapping tool may be a browser-based tool, allowing it to be used on virtually any computing platform. That is, the tool may be accessed through any Web browser, content imported and worked on, and the results saved to storage. Alternatively, or in addition, the tool may be deployed as a plugin for another application, or as a JavaMt applet, Java Swing app, or other application or application element. The particular implementation is not critical to the present invention.

While rendered within the mapping tool, the content may be presented so that the existing HTML tags regarding content items are displayed along with options for the editor to change or modify the tags. As each individual instance of a tagged content item is displayed within a working area of the tool interface, the so-called "primary selection", similarly tagged elements throughout the rest of the work are searched for, located and displayed within a separate area of the interface. We call these the "shadow selections" and "amplification" (discussed earlier) is then the process of applying changes to the primary selection across all of the shadow selections in an automated fashion. For example, the similar content items (the shadow selections) may be displayed in a column along one side of the interface where the editor can review them. This may allow for display of just the content items or the content items in context, depending on the amount of available display real estate. Note that the shadow selections may be individually selectable/de-selectable so that any changes to the primary selection can be selectively applied across some, all or none of the shadow selections at the user's option.

Figure 1B:
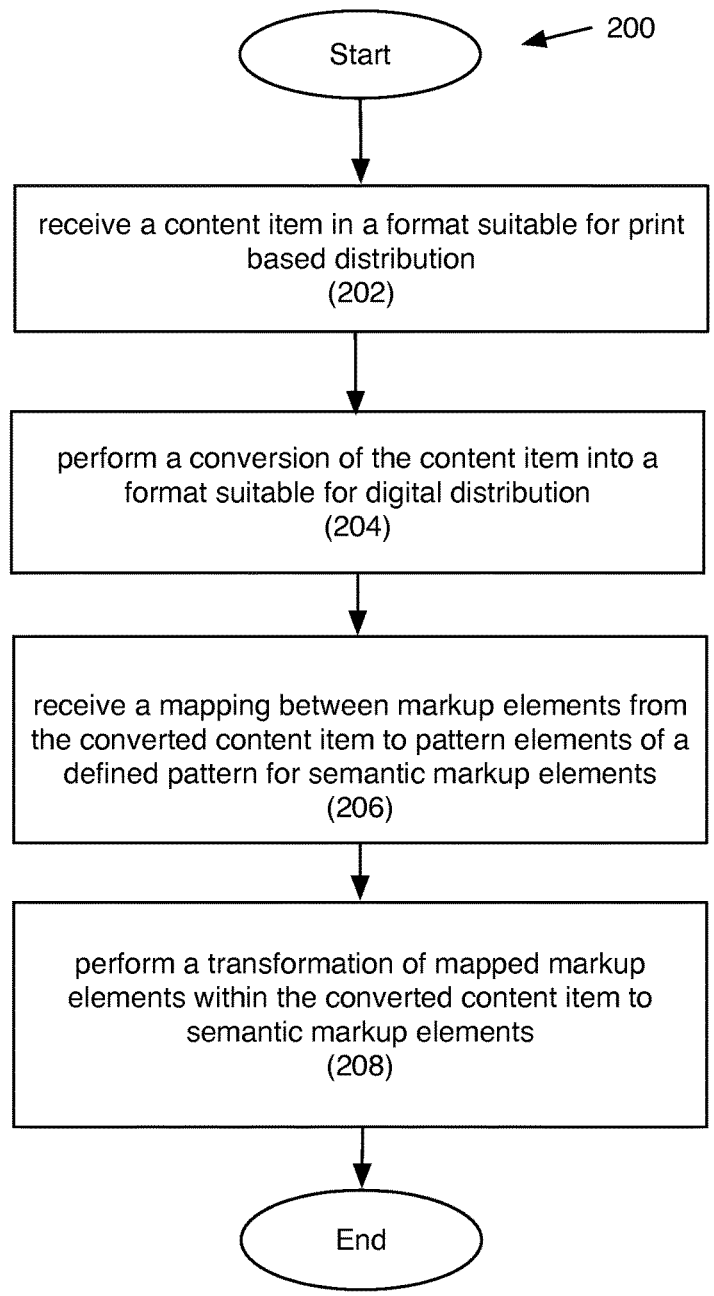
FIG. 1B is an exemplary flowchart depicting a process for conversion of content to formats suitable for digital distributions in accordance with some embodiments of the invention.

FIG. 1B is an exemplary flowchart 200 for conversion of content to formats suitable for digital distributions in accordance with some embodiments of the invention. A content item may be received for conversion and/or transformation (202). A content item may be a portion of a file, a file, and/or one or more files. In some embodiments, the content item may be in a format suitable for creation of a print content work. The content item may have a plurality of print based format document elements that define the structure and layout of the document elements for a print publication of the content work. Content received may be as an XML document.

A conversion of the content item may be performed (204). The content item may be converted from a format suitable for print based distribution to a format suitable for digital distribution, XML, and/or any other format. The conversion may involve translating each document element into one or more markup elements suitable for digital distribution (e.g., each IDML tag of a document element may be translated into one or more HTML tags of a markup element, each XML tag of a document element may be translated, etc.). An initial or first pass at converting a content item may "markup" or "annotate" the converted content item with tags and/or attributes (e.g., name-value pair attributes) to indicate the syntax of each document element from the content item. The tags and attributes in the converted element may indicate and replicate the syntax of the document elements of the original content item without conveying a meaning or semantics for the particular element. For example, an initial pass may produce a converted document element of a content item with tags for the syntax of the document element, as follows with example 1.0:

"<p><font color="#990000" size="5">This should be a header</font></p>

As shown with example 1.0, the initial pass or translation of the document may convert print based format document elements into markup elements with hard coded tags and attribute name-value pairs abiding by the rules for the markup language to reconstruct the text without attaching any meaning to the particular element and/or the text within the tags (e.g., identification of the text as a header). Continuing with the example, the tags have hard-coded attribute name-value pairs that may allow for reconstruction of the layout of the original document. However, no meaning or interpretation for the document element may be provided with the particular tags, such as that the document element is a header and/or a header within a section of a digital distribution of a book in the present example. In another example, markup elements may not provide information on relationships between elements, such as hierarchical (e.g., parent-child), nesting, etc. which is described in more detail in regards to FIG. 8D.

A transformation may be performed for selected markup elements within the converted content item into semantic markup elements. To indicate desired markup elements for transformation, a user may select and map markup elements of the converted content item to pattern elements of a defined pattern (206). The defined pattern may define one or more semantic markup tags and/or one or more markup attributes for each pattern element that may be assigned to a mapped element. For example, a defined pattern may define markup tags for each element of a callout section of a book, including tags to indicate the mapped markup element is both a header of the callout section/area and that the header is part of a callout section. In another example, metadata attributes may be defined for pattern elements that may be assigned to markup elements.

A transformation of mapped markup elements may be performed (208) by assigning at least one markup tag and/or attribute to the selected markup element defined with the corresponding mapped pattern element to the selected markup element.

By mapping markup elements to pattern elements of a defined pattern, a pattern, order, or sequence of markup elements is defined or established. Such that, an instance or a repeat of the pattern of markup elements may have markup elements of the same type and in the same order in the content item as the mapped markup elements. The repeat of the pattern may be matched, identified, or otherwise found within the content item. Transformations may be similarly applied to each matched markup element in the repeated pattern as are applied to the corresponding mapped markup elements of the defined pattern. In this way, mapping markup elements indicates both a selection of mapped markup elements for transformation and a selection of a pattern of markup elements (e.g., established with mapping markup elements to pattern elements of the defined pattern) that may likewise be transformed.

In addition, the mapping of markup elements to pattern elements may establish a new order for the markup elements that may be enforced when the document elements are transformed. For example, document elements of a content item may be ordered, as follows: (1) "DocElementA" and (2) "DocElementB" within the converted content item, and reordered in accordance with the mapping of the markup elements to ordered pattern elements within the defined pattern. Continuing with the example, the elements may be reordered as defined by the order of the pattern elements within the defined pattern, as follows: (pattern element 1) mapped to "DocElementB" and (pattern element 2) mapped to "DocElementA," and after transformation, document elements may be ordered within the content item, as follows: (1) "DocElementB" (2) "DocElementA."

FIG. 2 is an exemplary user interface for conversion of content to formats suitable for digital distributions in accordance with some embodiments of the invention. FIG. 2 provides an example of an interface 24 for a mapping tool. As shown, interface tools for importing files are provided (e.g., as part of a tool bar), as are visual indicators that reflect progress towards completion of editing the entire work, saving the file, and exporting the file to other formats, etc. In this example, a content item tagged with class names for chapters and titles (e.g., in the illustration the reference p.bun.ch refers to a style applied to a chapter heading and p.bun-tt refers to a style applied to a chapter sub-heading) has been brought into the working area of the tool (in this case, the left-hand column). In other instances, class names such as p.chapter-intro, p.title, etc., or other descriptive names may be used. It is worth noting that in the illustrated example, "bun" and "ch", both CSS classes on the given tag, were generated from a source file that has a style-like representation. Similar class names may be likewise generated from other source files.

Selection of the content elements identified with the chapter and title classes (the primary selection for this example) has resulted in all similarly tagged content items (the shadow selections) within the work being located and represented within the discovery pane of the tool (in this example a right-hand column displayed alongside the working area). This serves as a reminder to the editor that any changes applied to the chapter and title elements in the working area will be replicated across all such elements throughout the work. The user can choose to select or deselect elements within these shadow selections to have further control over what elements the amplification/transformation process affects.

Figure 3:
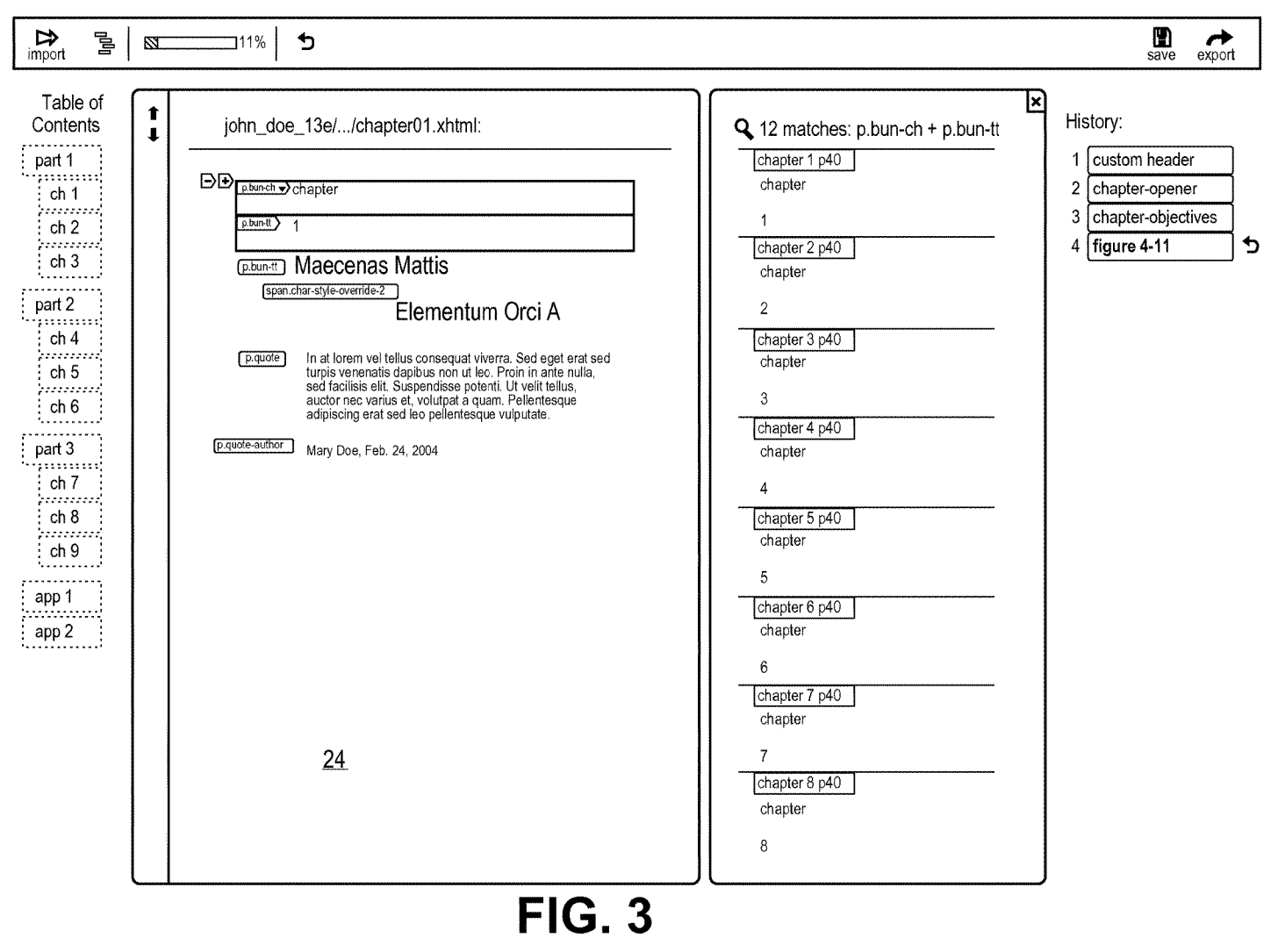

FIG. 3 is an exemplary user interface for conversion of content to formats suitable for digital distributions in accordance with some embodiments of the invention. FIG. 3 shows an alternative design of interface 24, with a display of the major sections of the content work (e.g., a table of contents) under review and a history of previous revisions presented for the editor.

Figure 4A:
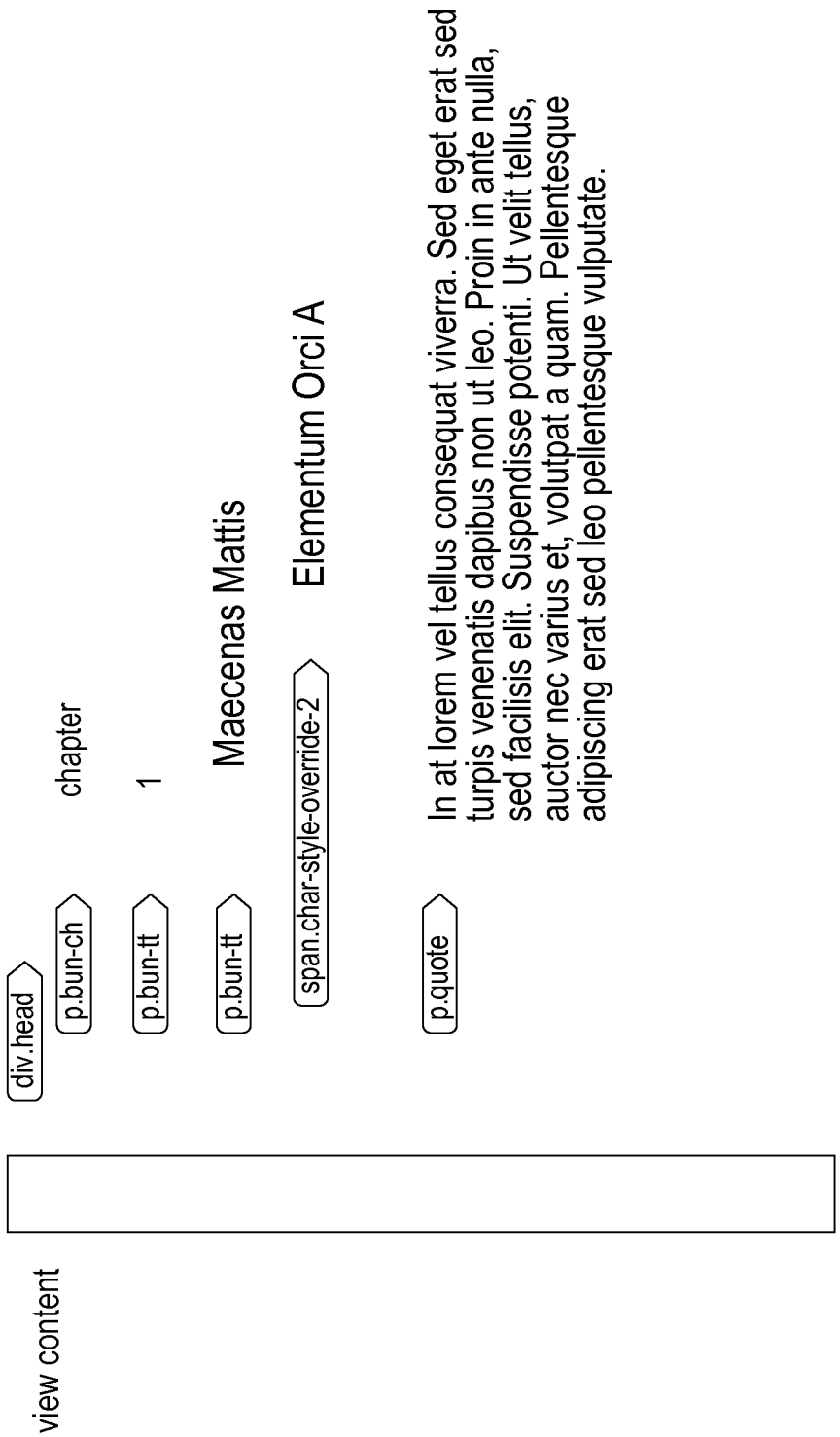
FIG. 4A is an exemplary user interface for conversion of content to formats suitable for digital distributions in accordance with some embodiments of the invention.
Figure 4B:
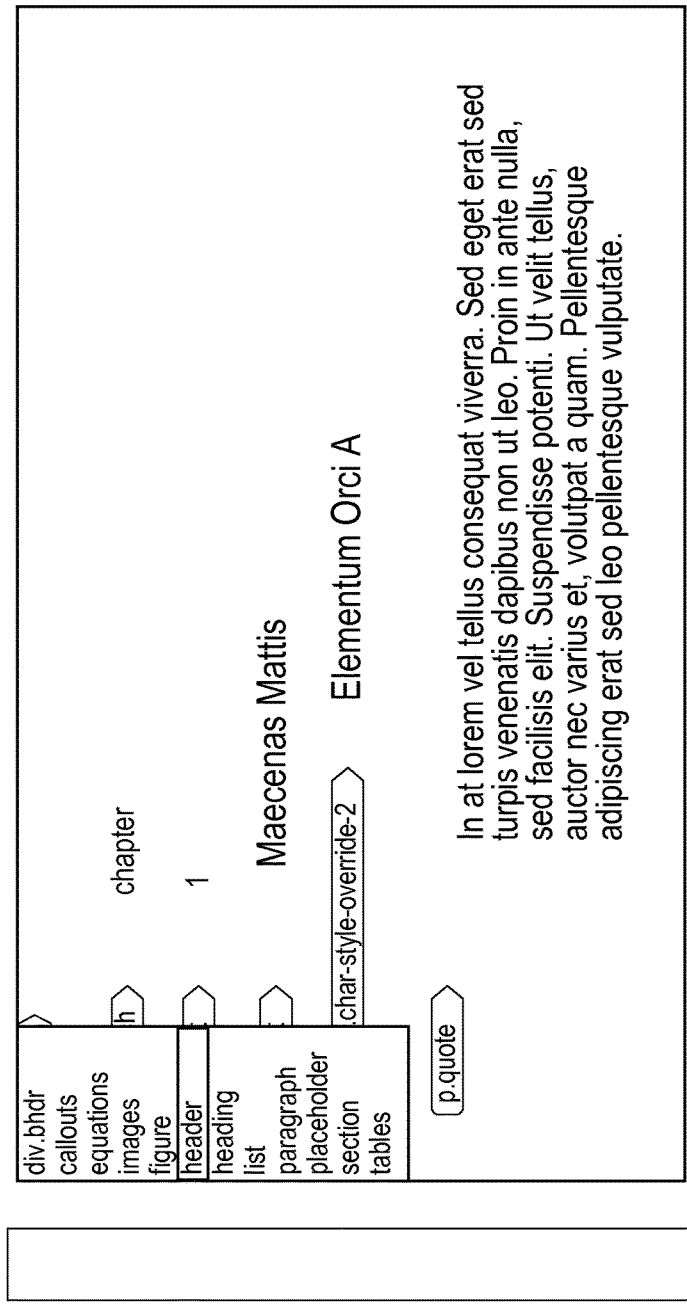
FIG. 4B is an exemplary user interface for conversion of content to formats suitable for digital distributions in accordance with some embodiments of the invention.

FIGS. 4A-F provide an overview of the use of an exemplary working area of the tool. FIG. 4A is an exemplary user interface for conversion of content to formats suitable for digital distributions in accordance with some embodiments of the invention. In an exemplary panel of a user interface as depicted in FIG. 4A, the content element and its existing tag structure has been displayed for an editor/user to review. In the next exemplary panel of a user interface as depicted in FIG. 4B, the editor/user has selected a pull down tag menu in order to change a div header tag that defines the container in which the content resides to a header tag (presumably because the header tag has attributes that the editor believes will be more suitable for presenting the content for view on electronic devices in the context of the current work).

Figure 4C:
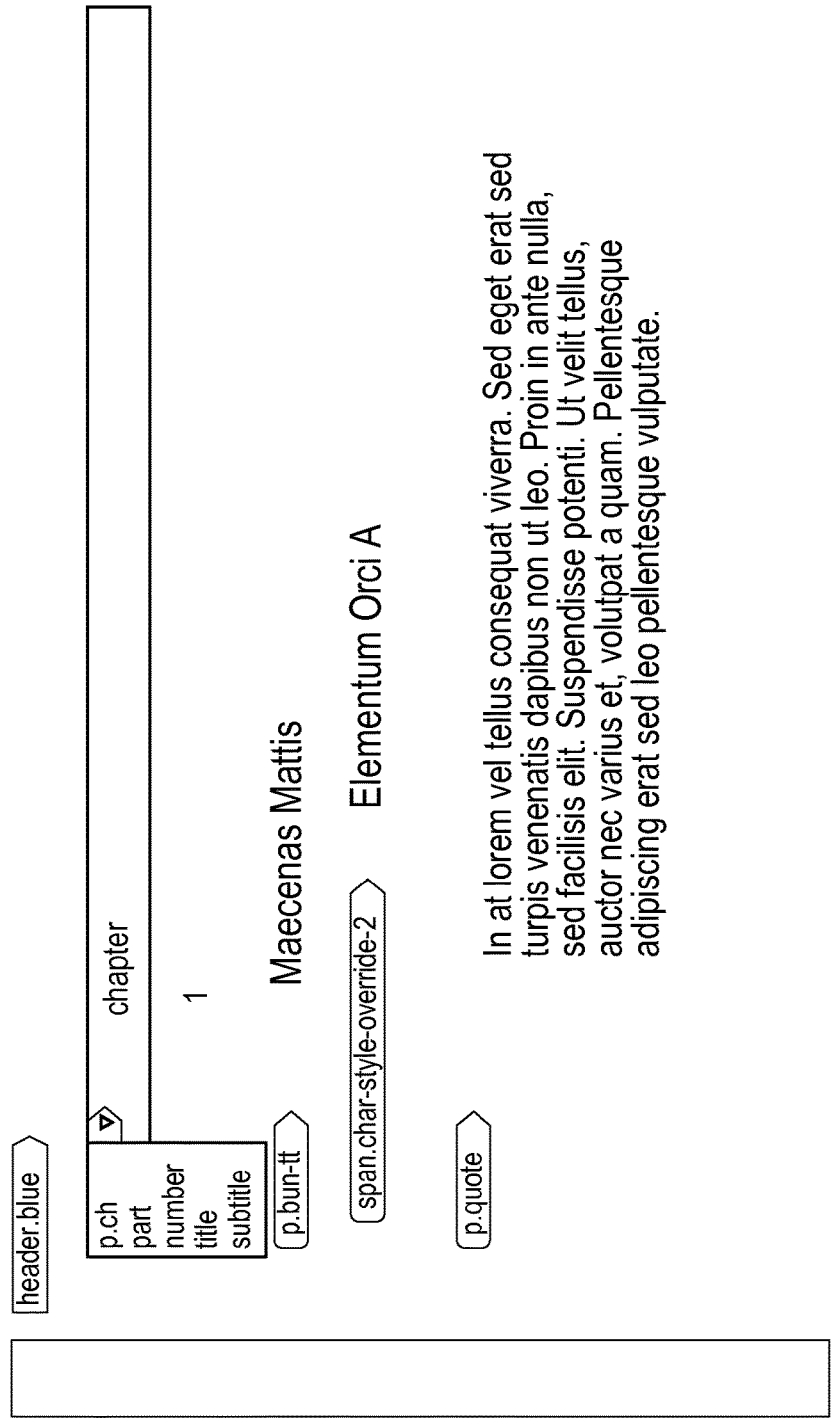
FIG. 4C is an exemplary user interface for conversion of content formatted to formats suitable for digital distributions in accordance with some embodiments of the invention.
Figure 4D:
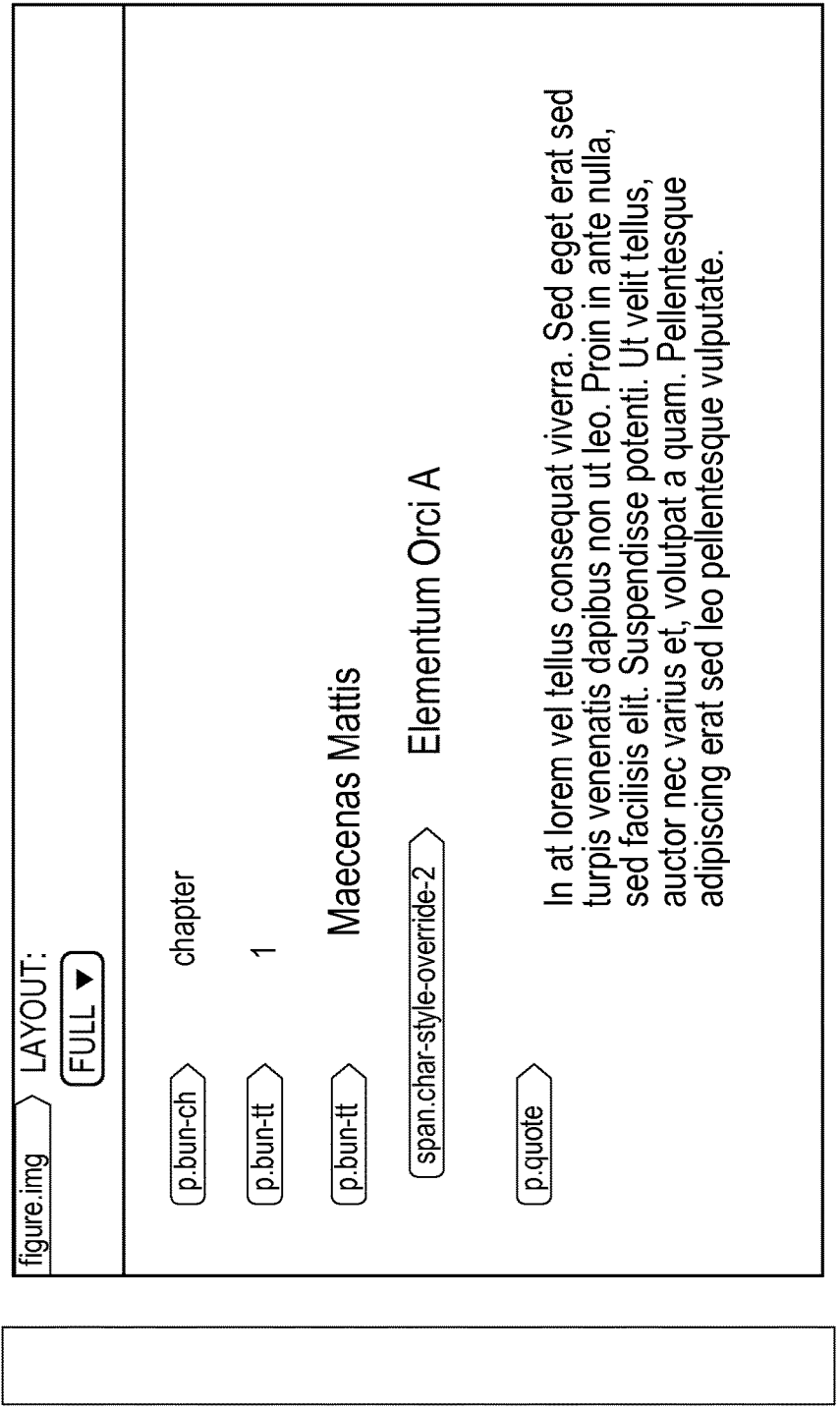
FIG. 4D is an exemplary user interface for conversion of content to formats suitable for digital distributions in accordance with some embodiments of the invention.
Figure 4E:
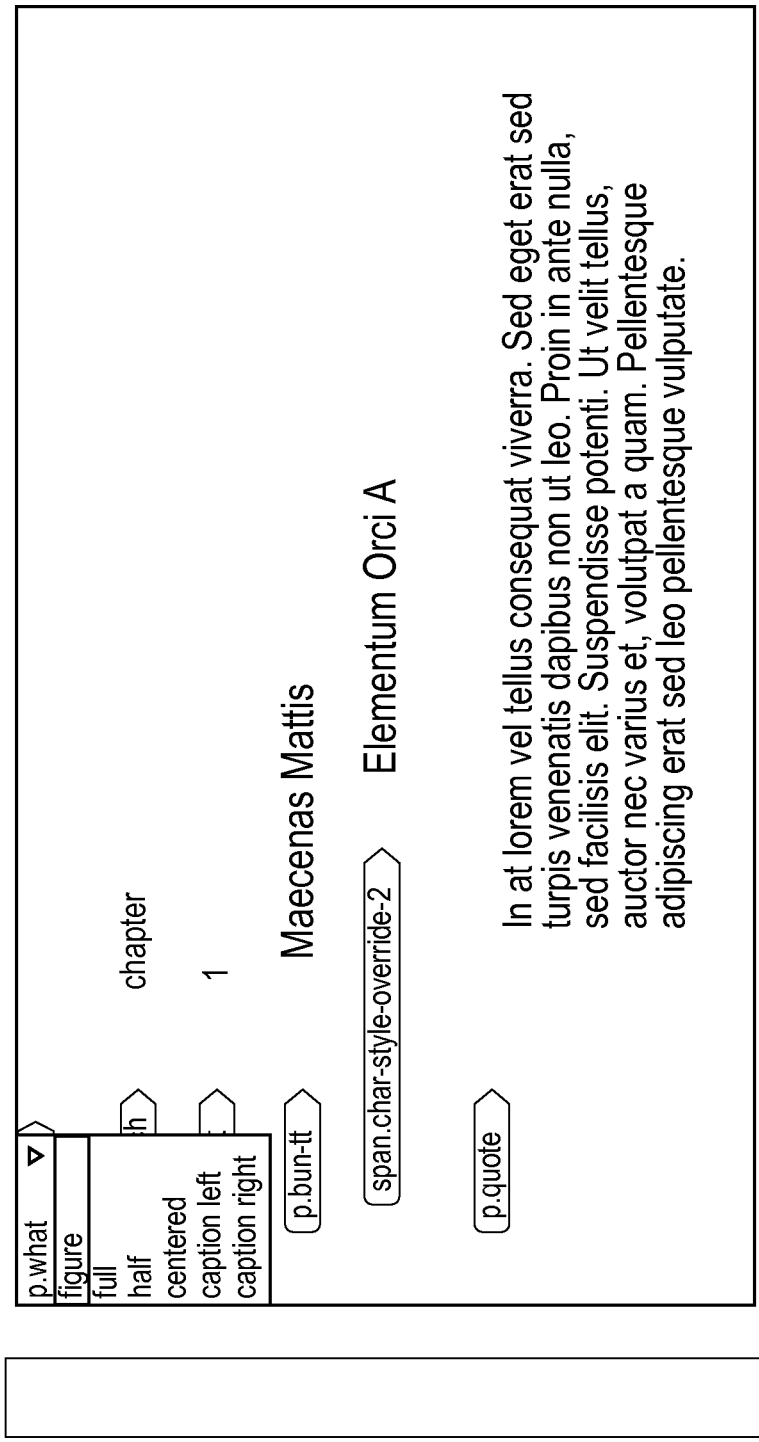
FIG. 4E is an exemplary user interface for conversion of content to formats suitable for digital distributions in accordance with some embodiments of the invention.
Figure 4F:
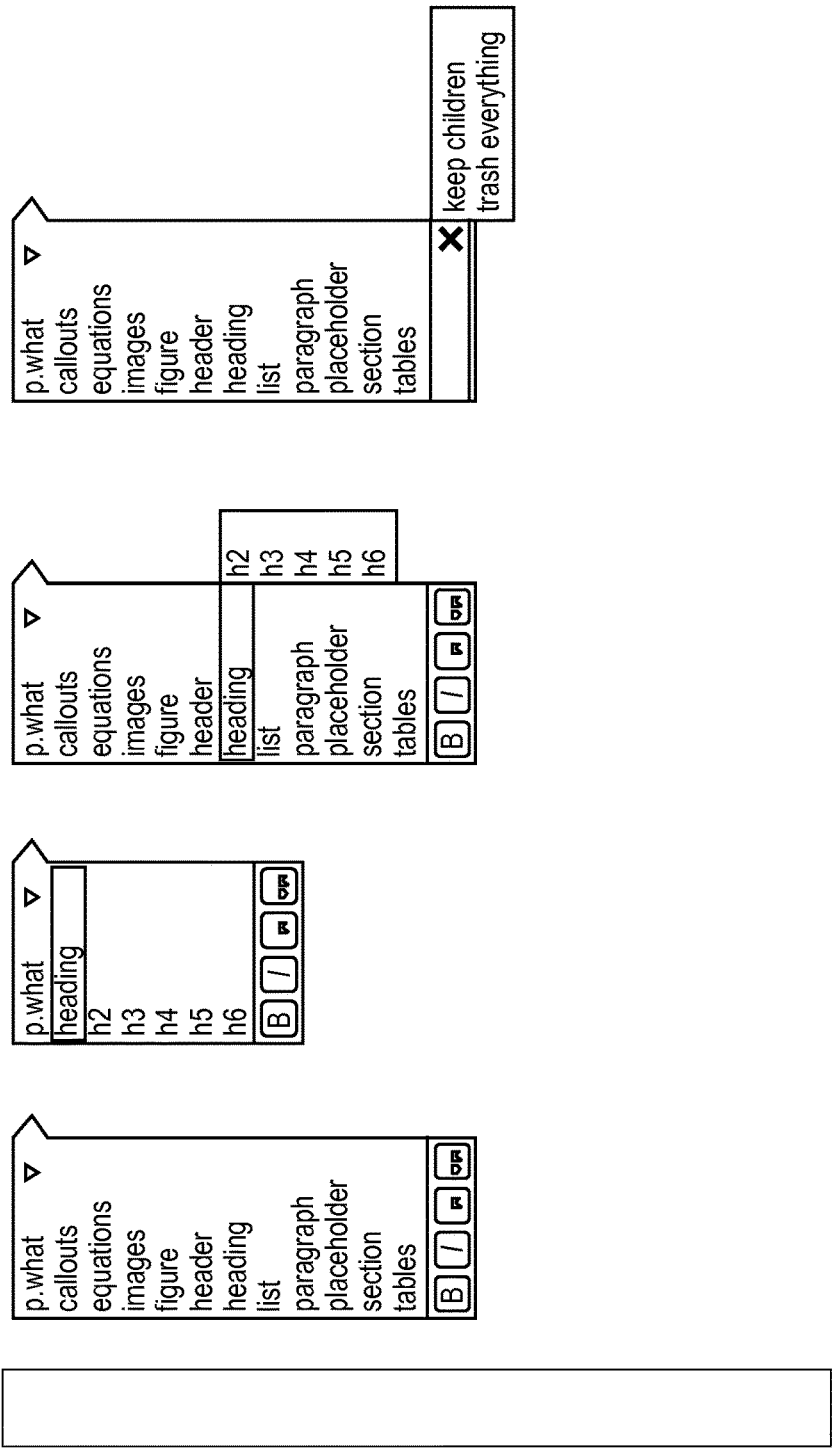
FIG. 4F is an exemplary user interface for conversion of content to formats suitable for digital distributions in accordance with some embodiments of the invention.

In the next panels FIGS. 4C-E, the container has been redefined and so options consistent with that container are now available for defining the content elements that exist within it. For example, styles for paragraphs and other elements can be selected, again using drop down menus of available choices. In FIG. 4F, examples of the selection choices are presented. These are not intended to be limiting, rather they are just examples of the kinds of available options which can be applied to various content elements.

Figure 5:
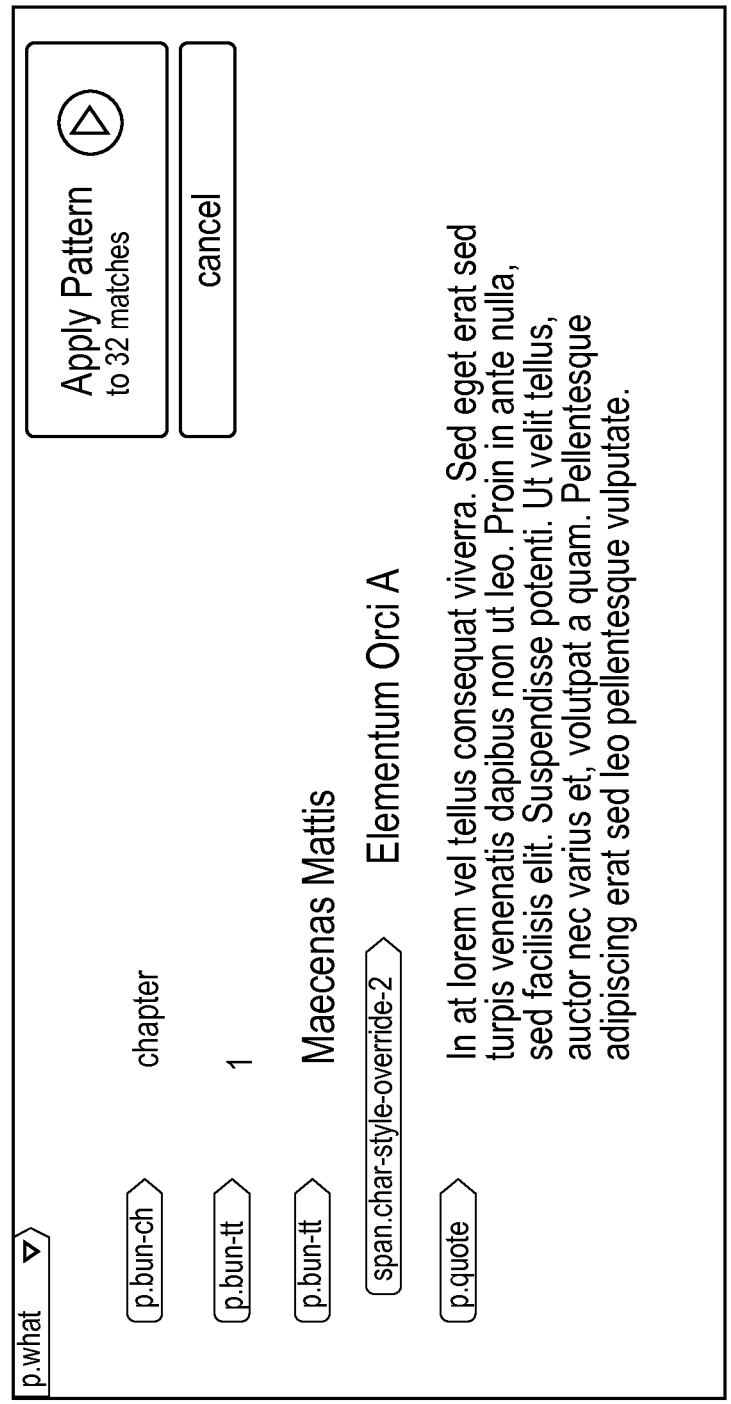
FIG. 5 is an exemplary user interface for conversion of content to formats suitable for digital distributions in accordance with some embodiments of the invention.

FIG. 5 is an exemplary user interface for conversion of content to formats suitable for digital distributions in accordance with some embodiments of the invention. As shown in FIG. 5, when the editor has completed work on the content element, he/she can choose to have the same edits applied to similar content elements across the entire work. Alternatively, the user may designate which content elements should/should not be affected by such changes. For example, the user may make selections using the list of content items presented in the right hand column (not shown, depicted and described in more detail in FIGS. 8C-8F).

In addition to editing tags, the present mapping tool can be used to create cards (presentation units for the content when displayed on electronic devices) by inserting cuts at various positions. This is illustrated graphically in FIG. 6.

Figure 6:
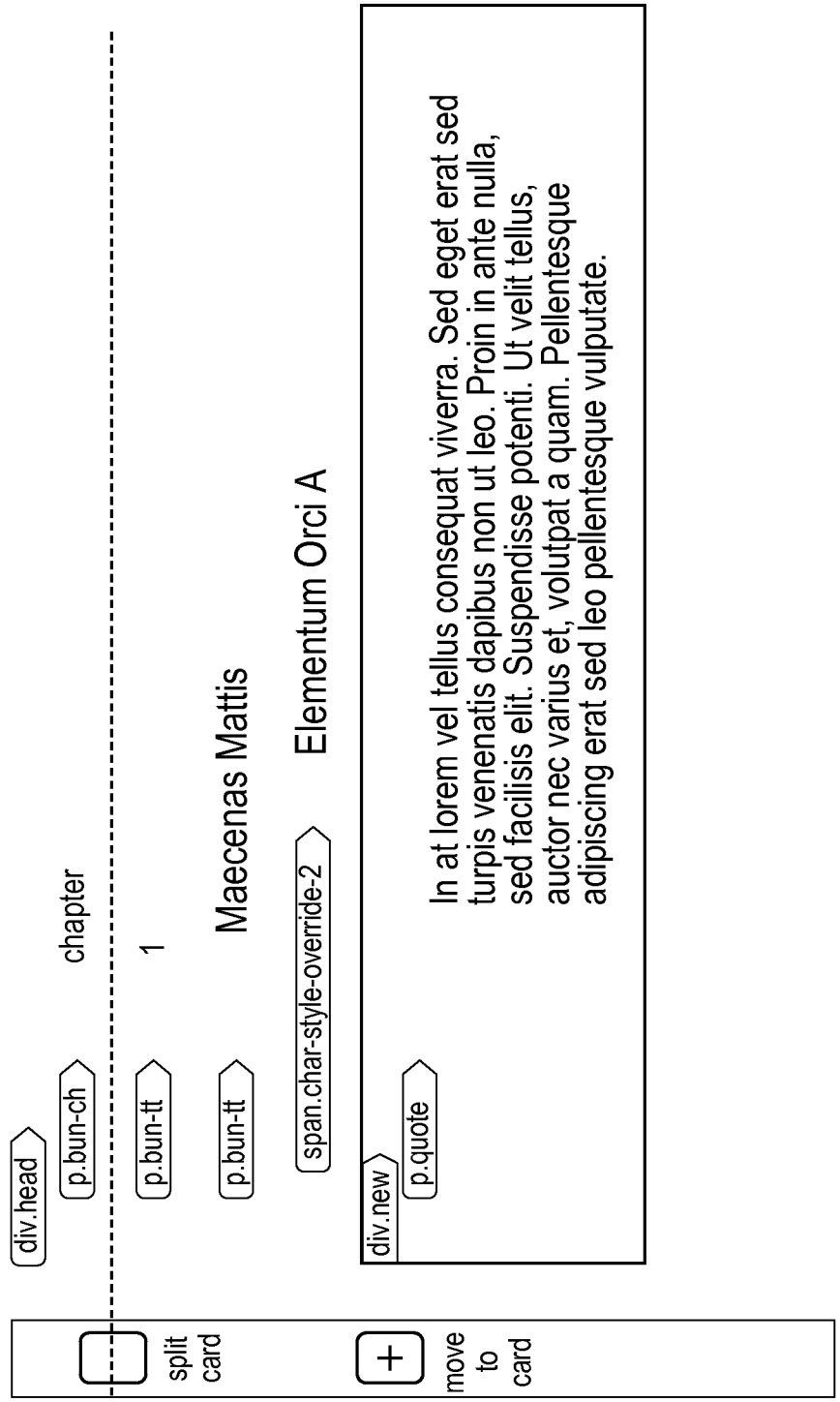
FIG. 6 is an exemplary user interface for conversion of content to formats suitable for digital distributions in accordance with some embodiments of the invention.

FIG. 6 is an exemplary user interface for conversion of content to formats suitable for digital distributions in accordance with some embodiments of the invention. Cuts may be provided at locations that preserve story flow, etc. The user can also choose to chunk out portions of a given primary selection (e.g., chunks of html with a sequence or a pattern with one or more elements) and similar pattern of elements matched on the shadow selections into user-created cards. This gives the user the ability to chunk out parts of a given card into its own card rather than have content that may be split across a card (i.e., a presentation unit) after conversion of the original content. This may be an appropriate way of handling content that, in a print version of the work, appeared in sidebars or other contextual settings. Such content is relocated into its own file container for presentation in the electronic version of the work. By way of example, sidebars may be a card that is split off from a card for a card for the chapter and placed in a separate file from a file with the chapter content.

Figure 7B:
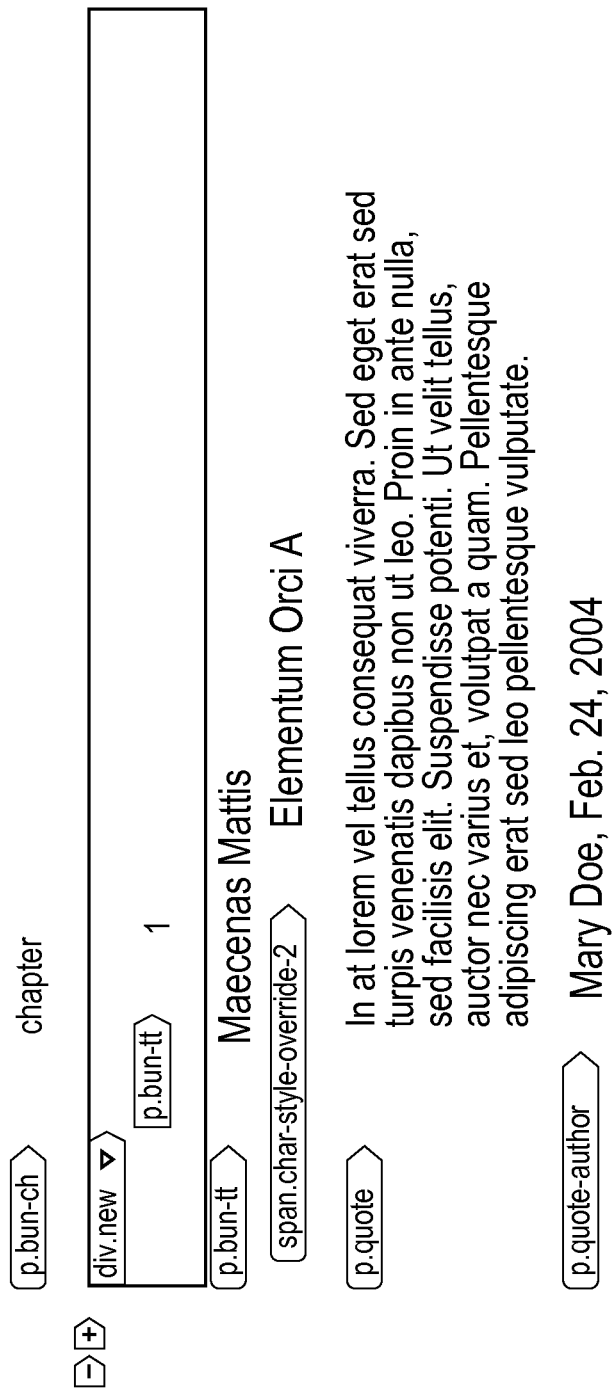
FIG. 7B is an exemplary user interface for conversion of content to formats suitable for digital distributions in accordance with some embodiments of the invention.
Figure 7C:
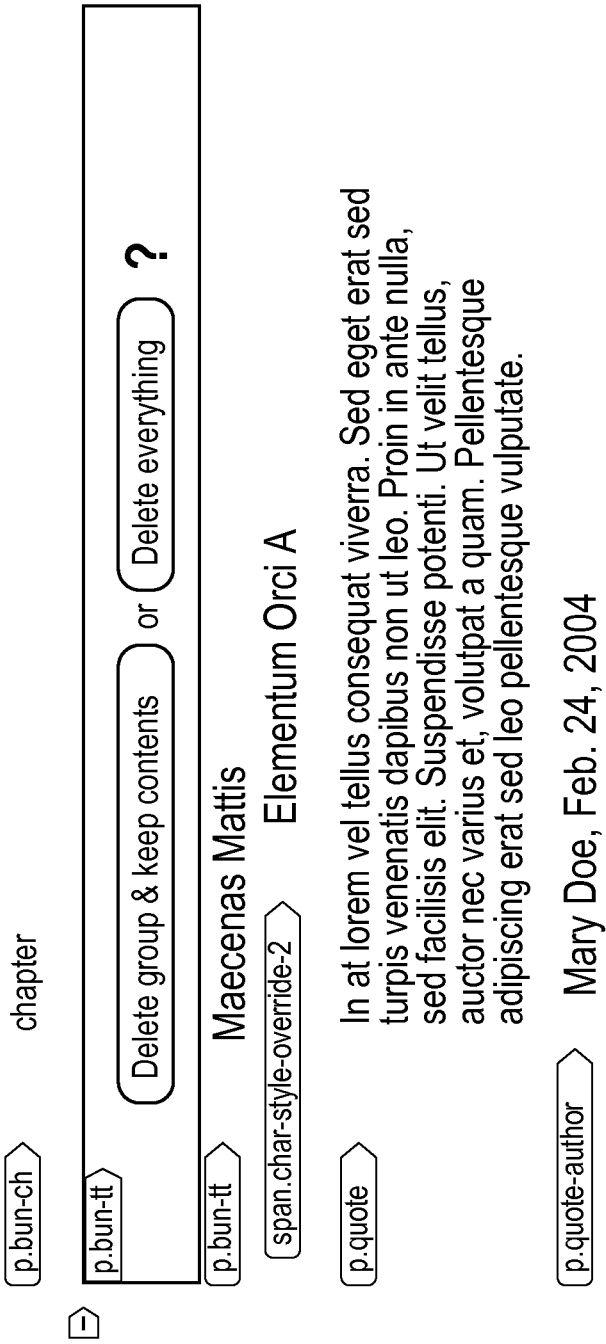
FIG. 7C is an exemplary user interface for conversion of content to formats suitable for digital distributions in accordance with some embodiments of the invention.

FIG. 7A is an exemplary user interface for conversion of content to formats suitable for digital distributions in accordance with some embodiments of the invention. FIG. 7A-C illustrates a series of user interface actions. FIG. 7A involves selection of content elements, FIG. 7B involves grouping of similar content elements across the work for common treatment, and FIG. 7C involves deletion of content elements. As shown in FIG. 7C, deletion may involve deleting just the tags or the tags and the associated content.

The mapping tool thus allows an editor to proceed rapidly through a content work, adjusting the style and layout of the work so that it is suitable for publishing on an electronic device. By allowing the editor's actions applied to one content element to be effected in real time across all similar content elements in the content work, the present mapping tool is able to amplify the effect of that editor's work considerably. As a result, tasks that may have taken many hours or days in the past can now be achieved in a much shorter period of time. Notice that the amplifying effect of the mapping tool applies not only to changes in the HTML tags, but also to any changes in CSS as well.

Returning to FIG. 1A, once the mapping process has been completed, an automated quality analysis (QA) process 20 may be performed. We refer to the collection of activities in the QA process as a series of "unit proofs." Analogous to "unit tests" by which individual components of computer program source code are tested to ensure they are fit for use, our unit proofs are intended to examine individual components of the semantic HTML file(s) for compliance with one or more desired attributes or characteristics. This may involve reviewing the use of hyphens within the content work to ensure breaks are appropriate and not disruptive to the reader experience. Likewise, the overall balance between text, images and whitespace can be reviewed for pleasing effects. Spell checking and other editing can also be performed and unusual characters can be reviewed for consistency and appropriate use. Any unknown class names and structures can also be examined for consistency across the work.

Figure 8A:
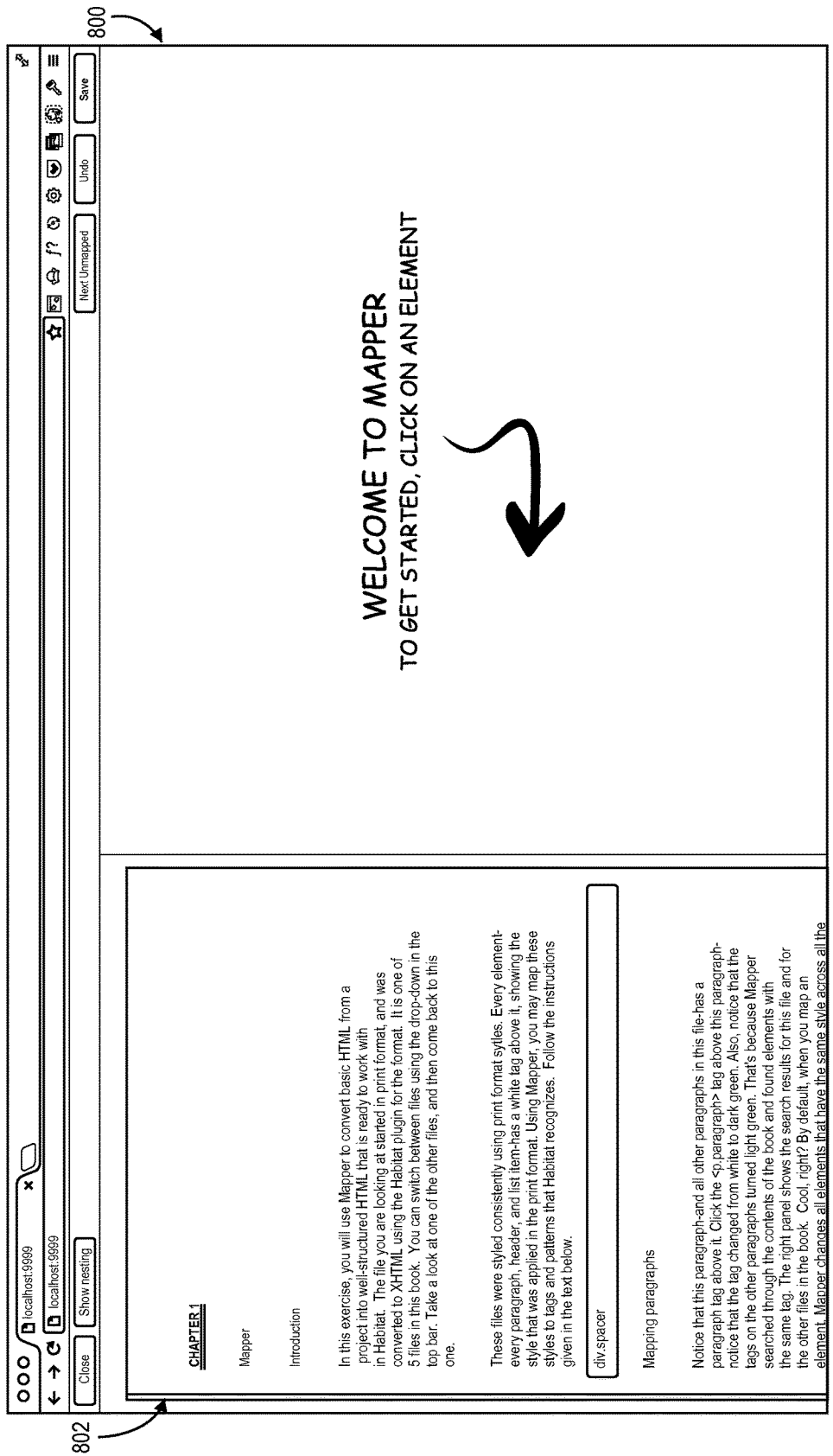
FIG. 8A is an exemplary user interface for conversion of content to formats suitable for digital distributions in accordance with some embodiments of the invention.

FIG. 8A is an exemplary user interface for conversion of content to formats suitable for digital distributions in accordance with some embodiments of the invention. User interface 800 has a "working area" panel 802 displaying text of the content item and optionally, a markup element (e.g., an element delineated by one or more markup tags) from a converted content item. By way of example, the markup element may be displayed in panel 802 with a hypertext markup language element tag and/or any other text that may aid the user in identifying the element as a converted element from the original content item (e.g., a proprietary tag or name assigned to the document element). Continuing with the example, the markup element may be "div.spacer" with a combination of a hypertext markup language element (e.g., "div") and a name for a proprietary tag for the document element within the original document (e.g., "spacer").

User interface controls are provided for interaction with the user interface and selection of markup language elements. For example, a user may hover a cursor over a document element in the working area panel 802 to cause a markup element tag to be displayed (e.g., "div.spacer") within the user interface. The user may click on a portion of the displayed content item within the user interface to select a particular markup element.

In some embodiments, each markup element within the converted content item that contains text may be identified as an element for a user to map. A user may then step through each identified and unmapped markup element. For example, a markup element such as "<p>text</p>" may be identified as a markup element that may be mapped due to the string literal "text" between the markup element tags. In another example, a markup element "<img src="default.jpg">" may be identified as an element to be mapped from the string literal "default.jpg" with the "img" tag.

Figure 8B:
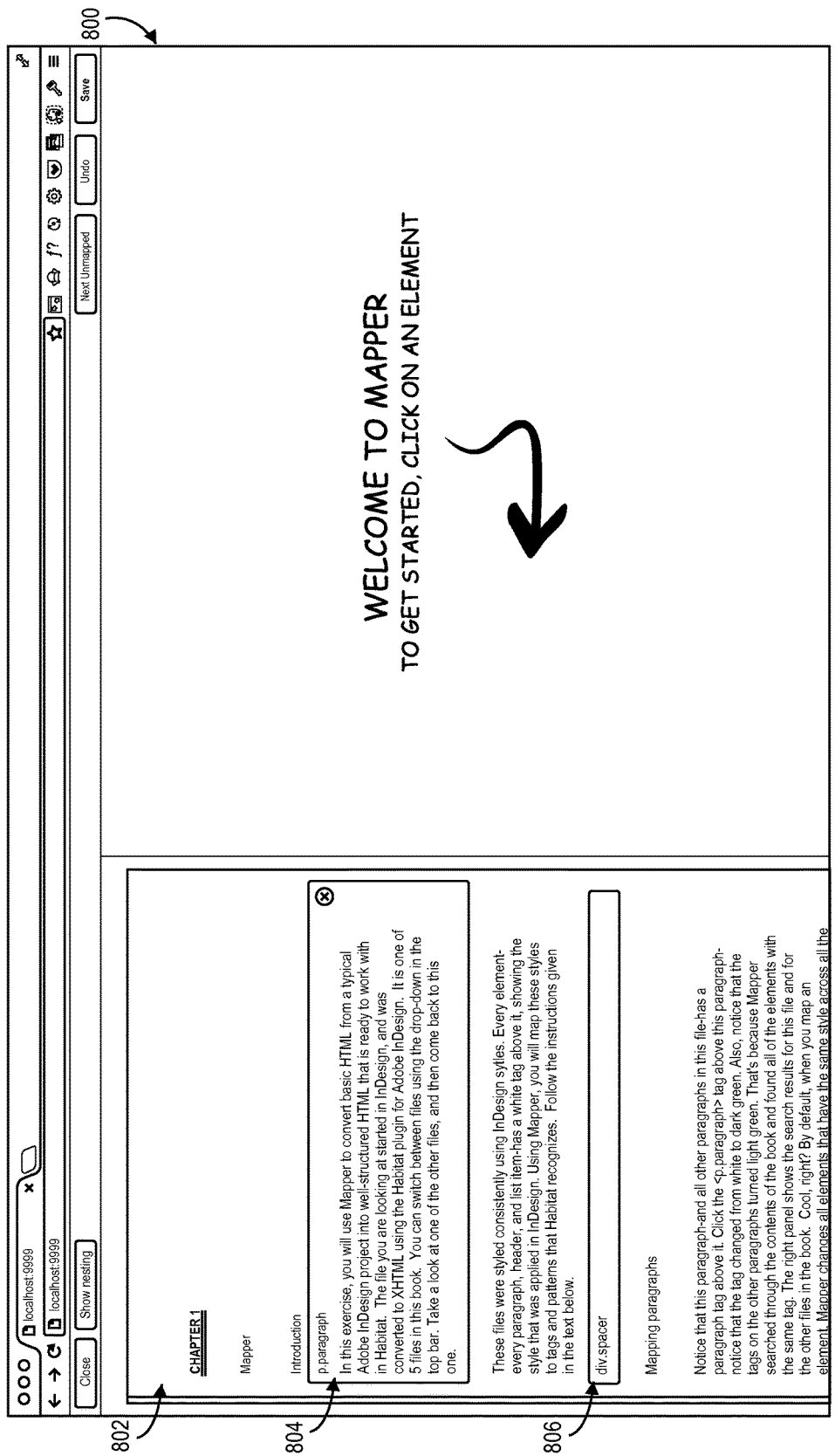
FIG. 8B is an exemplary user interface for conversion of content to formats suitable for digital distributions in accordance with some embodiments of the invention.

FIG. 8B is an exemplary user interface for conversion of content to formats suitable for digital distributions in accordance with some embodiments of the invention. User interface 800 depicts a working area panel 802 with markup elements 804 and 806 selected. In some embodiments, selection of markup elements that may be mapped to defined patterns may trigger the display of menus to perform the mappings of markup elements to defined patterns, and a list of similar combinations or groupings of the selected markup elements that may be found throughout the content item as shown in FIG. 8C.

Figure 8C:
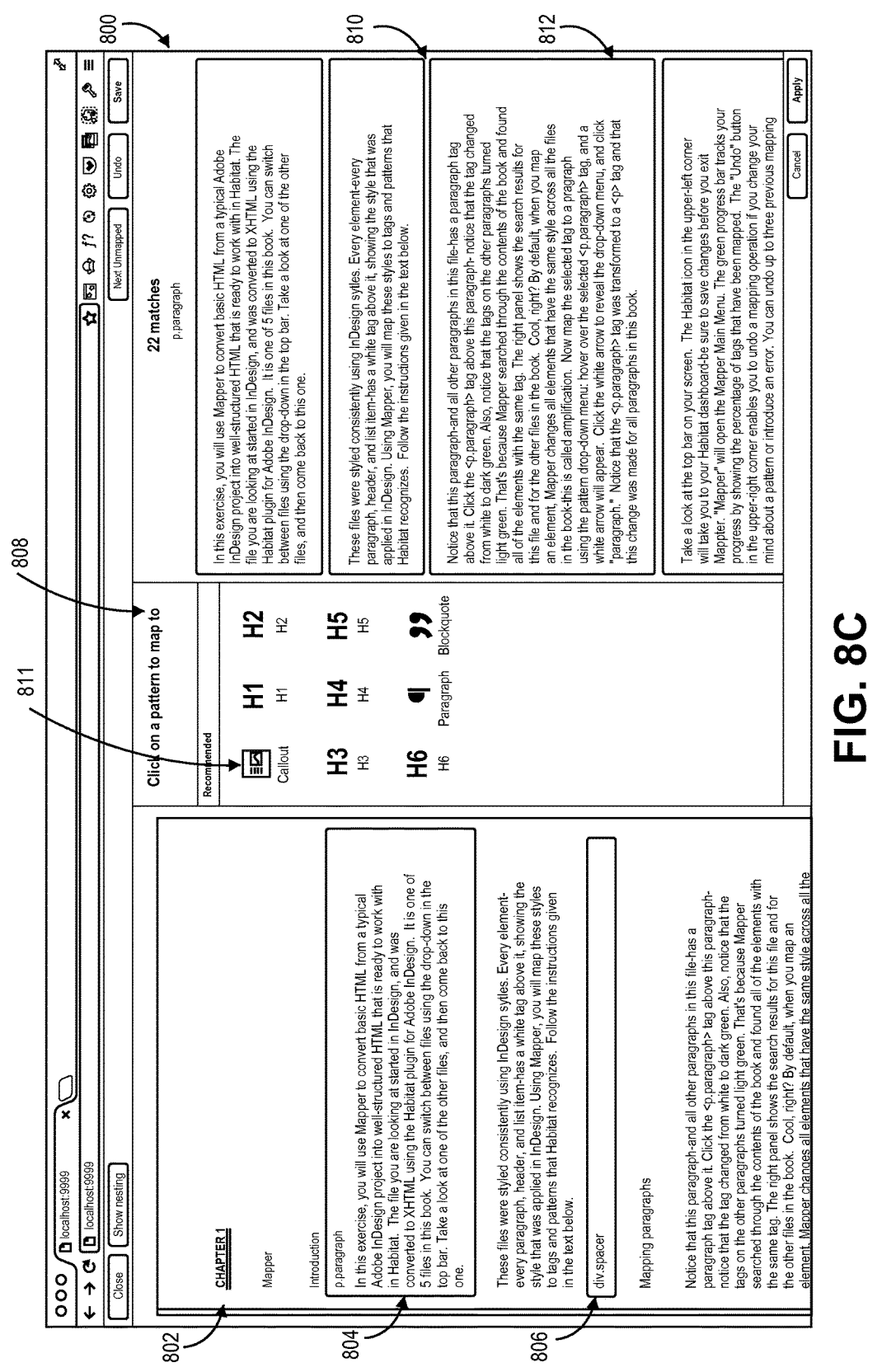

FIG. 8C is an exemplary user interface for conversion of content to formats suitable for digital distributions in accordance with some embodiments of the invention. User interface 800 depicts a working area panel 802 with selected markup elements 804 and 806. A menu 808 may be displayed with user interface controls (e.g., control 811 for selection of a "callout" pattern) for selection of defined patterns. Patterns may be predefined for the user and/or the user may define their own patterns. Menu 808 may be viewed as a "palette" having one or more patterns available for selection, and for which, markup elements may be mapped to corresponding pattern elements of a selected pattern.

Panel 810 provides a listing of groups of markup elements similar or matched to the selected markup elements 804 and 806 (e.g., having the same pattern of elements) in menu 802 that may be found in the converted content item. By way of example, grouping 812 may be a "p.paragraph" element similar to 804 and a "div.spacer" element similar to 806. Panel 810 may provide a listing of groups of markup elements to illustrate that each of the displayed groups (e.g., grouping 812) may be transformed with the defined pattern selected from 808 having pattern elements mapped to elements 804 and 806.

Figure 8D:
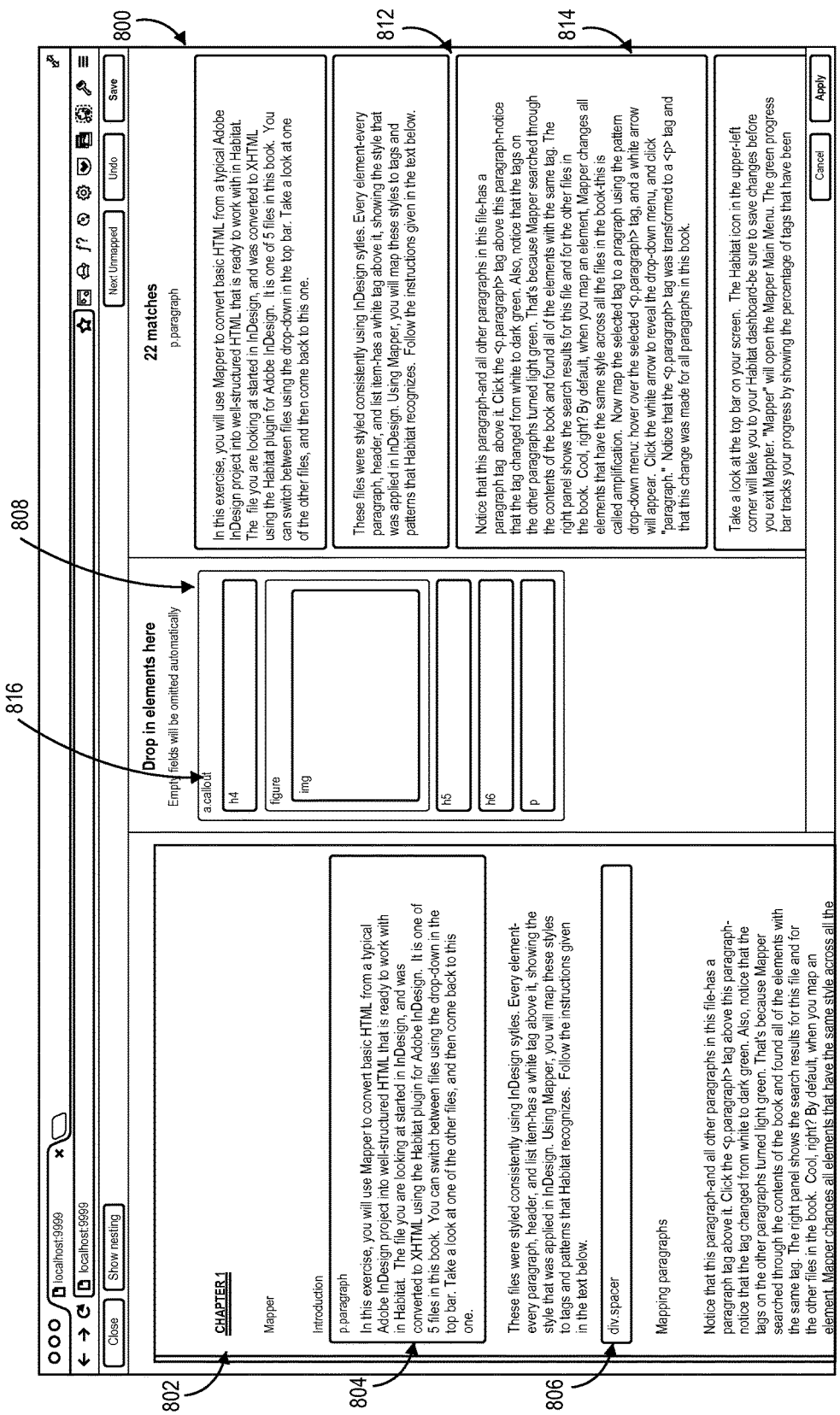
FIG. 8D is an exemplary user interface for conversion of content to formats suitable for digital distributions in accordance with some embodiments of the invention.

FIG. 8D is an exemplary user interface for conversion of content to formats suitable for digital distributions in accordance with some embodiments of the invention. A selected defined pattern 816 (e.g., "a.callout" pattern) is displayed within panel 808 of user interface 800. Defined pattern 816 has pattern elements "h4," "figure," "img," "h5," "h6," and "p." Markup elements displayed in panel 802 may be mapped to pattern elements of the defined pattern. As shown, a pattern element of a defined pattern may have one or more relationships to each pattern element within their respective defined pattern, including, but not limited to an ordering of markup elements, hierarchical relationships between markup elements (e.g., "img" markup element that is a child of "figure" element), and/or nesting relationships between elements (e.g., "h4" is nested beneath "a.callout"). For example, the pattern elements of the defined pattern 808 form a sequence of elements that form a pattern. By mapping markup elements to pattern elements of defined pattern for a group, a semantic meaning may be attributed to each markup element both individually (e.g., a heading "h1") and as a markup element that is part of the group (e.g., a heading "h1" of a "callout" section of a book).

Figure 8E:
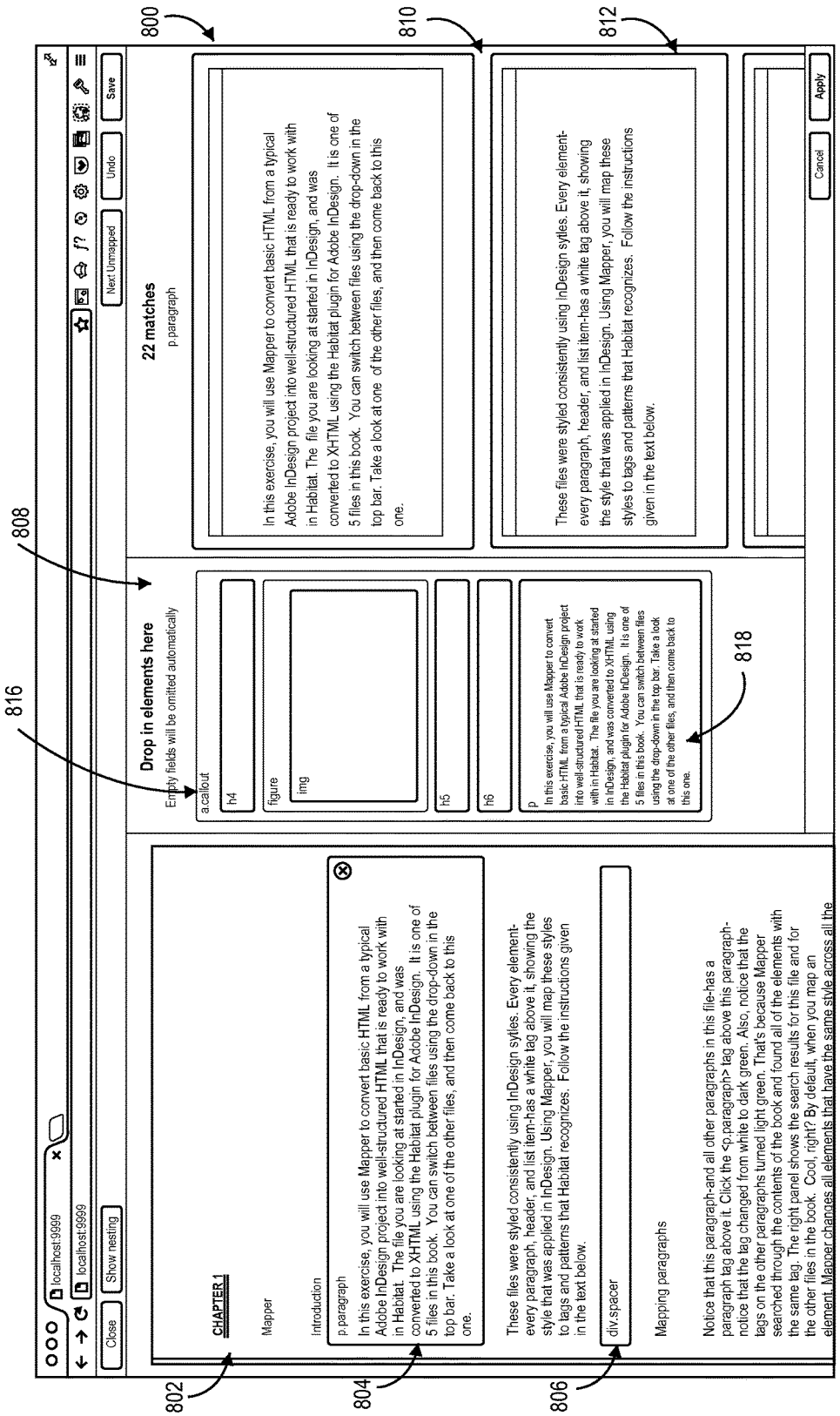
FIG. 8E is an exemplary user interface for conversion of content to formats suitable for digital distributions in accordance with some embodiments of the invention.

FIG. 8E is an exemplary user interface for conversion of content to formats suitable for digital distributions in accordance with some embodiments of the invention. As shown in panel 808, a user may use the user interface to indicate mapping of markup element 804 to a pattern element 818 of defined pattern 816. By way of example, a user may select markup element 804 and drag and drop the selected markup element 804 to pattern element 818.

Figure 8F:
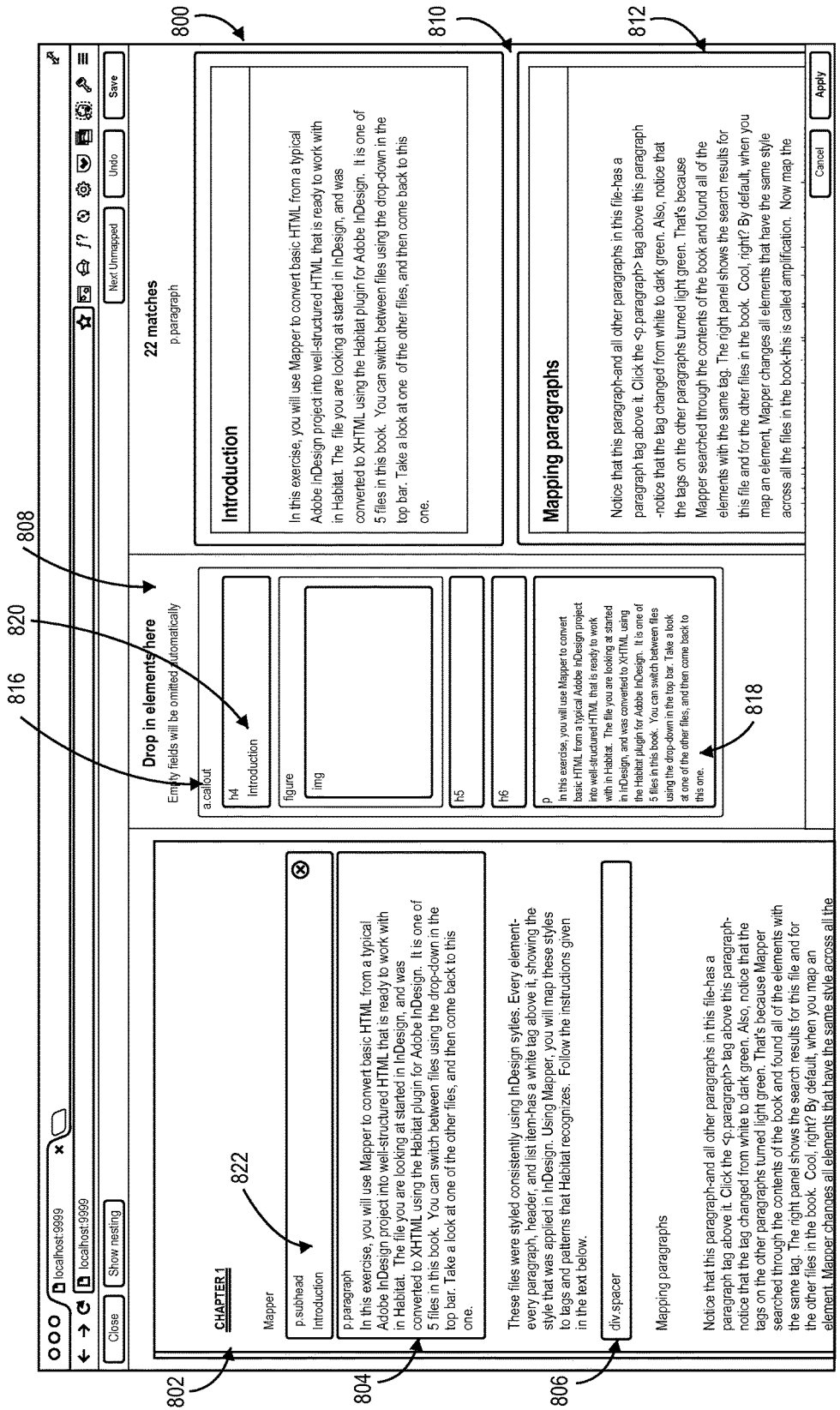
FIG. 8F is an exemplary user interface for conversion of content to formats suitable for digital distributions in accordance with some embodiments of the invention.

FIG. 8F is an exemplary user interface for conversion of content to formats suitable for digital distributions in accordance with some embodiments of the invention. FIG. 8F illustrates further mappings indicated with user interface 800 with both markup elements 822 and 804 mapped to pattern elements of 808. As shown in panel 810, a similar group/pattern of markup elements 812 to elements 822 and 804 may be matched within the content item, and transformation of the markup elements may be performed similar to those applied to markup elements 804 and 822 in the amplification process. In particular, markup element tags may be renamed to the semantic markup elements found in defined pattern 808.

Within the present methods and systems, several enhancements can be made. For example, in one embodiment of the invention, image placement within the HTML file may be determined based upon mean field theory-types of calculations. Briefly, this involves determining average paragraph or other container sizes and fitting images within text sections accordingly. While this may result in serviceable layouts, improvements may be had if instead the dimensions of each paragraph or other container, or even each text or other element is determined and taken into consideration when fitting images into the layout. The more precise measures and resulting placement decisions may provide for a better overall reader experience in that the relationships between text and images will be better balanced in the context of the content as it is presented to the reader. Likewise, paragraph breaks can be placed in appropriate locations so as to permit smooth text reflowing.

In some embodiments, it may be beneficial to maintain log files or other records of changes made by the mapping tool so that these changes can be rolled back, if desired, or applied in bulk to future works. For example, it is often the case that works are produced as part of a series and as such the desire is to preserve the look and feel of works of the series. This may be easily accomplished by maintaining a record of the style changes applied by the mapping tool for one work in the series and then automatically applying the same (or a subset of) transformations to other works in the series. The same may be true where a single content work is produced in multiple versions. Or, in some instances, where a work is produced in different versions but no information regarding changes between the versions is available, the transformations applied by the mapping tool to a prior version may be rolled back, a difference from the new source version obtained, and, based on the differences, appropriate ones of the previously applied changes (i.e., transforms) automatically effected to the source file of the new version so as to quickly achieve the look and feel of the prior version.

In the foregoing description, certain flow diagrams have been shown and processes described in relation to those flow diagrams that provide a reference for discussion purposes. In an actual implementation of the methods of the present invention, the steps can comprise event-driven routines that can run in parallel and can be launched and executed other than as shown by the simple depiction in the flow diagrams. In short, the particular order of the steps in the flow diagrams is illustrative of the invention, but not limiting of the various permutations that can be achieved in a given embodiment. Accordingly, it is the performance of the steps recited in the claims appended below which is pertinent, and not the order of operation of the steps themselves.

Figure 9:
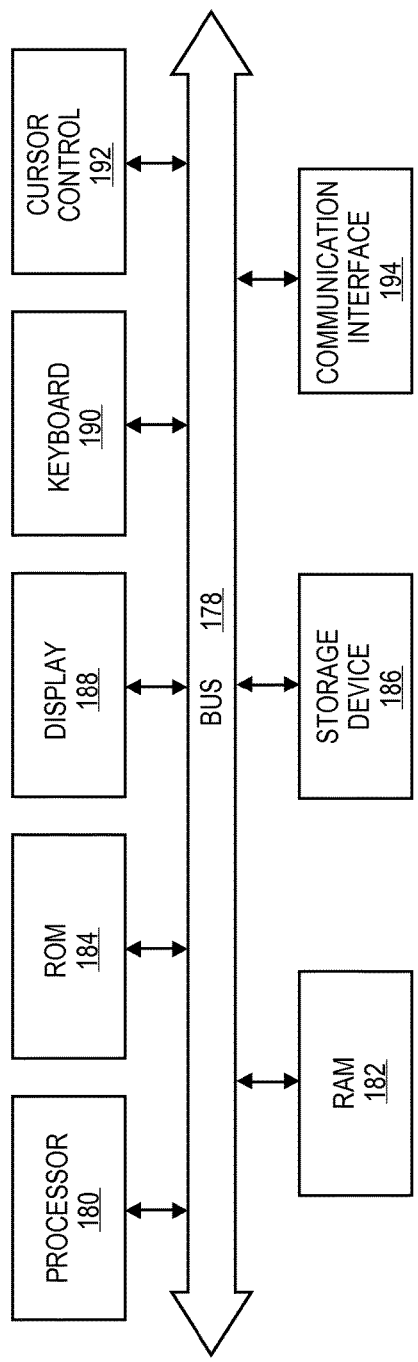
FIG. 9 is an exemplary computer system in accordance with some embodiments of the invention.

Further the procedures described herein may involve the use of various computer systems and computer readable storage media having computer-readable instructions stored thereon. FIG. 9 provides an example of a computer system 176 that is representative of any of the computer systems or electronic devices discussed herein. Note, not all of the various computer systems may have all of the features of computer system 176. Computer systems such as computer system 176 may be referred to by other names, for example as hand-held devices, mobile devices, smart phones, multi-processor systems, microprocessor-based electronic devices, digital signal processor-based devices, networked computer systems, minicomputers, mainframe computers, personal computers, servers, laptop computers, tablet computers, and the like. Such labels are not critical to the present invention.

Computer system 176 includes a bus 178 or other communication mechanism for communicating information, and a processor 180 coupled with the bus for processing information. Computer system 176 also includes a main memory 182, such as a random access memory (RAM) or other dynamic storage device, coupled to the bus for storing information and instructions to be executed by the processor. Main memory 182 also may be used for storing temporary variables or other intermediate information during execution of instructions to be executed by processor 180. Computer system 176 further includes a read only memory (ROM) 184 or other static storage device coupled to the bus for storing static information and instructions for the processor 180. A storage device 186, which may be one or more of a hard disk, flash memory-based storage medium, or other storage medium, is provided and coupled to the bus 178 for storing information and instructions (e.g., operating systems, applications programs and the like).

Computer system 176 may be coupled via the bus 178 to a display 188, such as a liquid crystal or light emitting diode display, for displaying information to a user. An input device 190, such as a keyboard including alphanumeric and other keys, is coupled to the bus 178 for communicating information and command selections to the processor. In some embodiments, the keyboard will be a software construct rendered via a touch screen display 188. Another type of user input device is cursor control device 192, such as a mouse, a trackball, or cursor direction keys for communicating direction information and command selections to processor 180 and for controlling cursor movement on the display. Where a touch screen display is used, cursor control functions may be implemented using finger-based gestures directly on the display. Other user interface devices, such as microphones, speakers, etc. are not shown in detail but may be involved with the receipt of user input and/or presentation of output.

The processes referred to herein may be implemented by processor 180 executing appropriate sequences of computer-readable instructions contained in main memory 182. Such instructions may be read into main memory from another computer-readable medium, such as storage device 186, and execution of the sequences of instructions contained in the main memory causes the processor to perform the associated actions. In alternative embodiments, hard-wired circuitry or firmware-controlled processing units (e.g., field programmable gate arrays) may be used in place of or in combination with processor 180 and its associated computer software instructions to implement the invention. The computer-readable instructions may be rendered in any computer language including, without limitation, C#, C/C++, assembly language, markup languages (e.g., HTML, SGML, XML, VoXML), Javascript, and the like, as well as object-oriented environments such as the Common Object Request Broker Architecture (CORBA), Java™ and the like. In general, the flow diagrams are intended to be illustrative of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying" or the like, refer to the action and processes of an appropriately programmed computer system, such as computer system 176 or similar electronic computing device, that manipulates and transforms data represented as physical (electronic) quantities within its registers and memories into other data similarly represented as physical quantities within its memories or registers or other such information storage, transmission or display devices.

Computer system 176 also includes a communication interface 194 coupled to the bus 178. Communication interface 194 provides a two-way data communication channel with a computer network, such as network 18 in FIG. 1, which provides connectivity to and among the various servers discussed above. For example, communication interface 194 may be a local area network (LAN) card (wired and/or wireless) to provide a data communication connection to a compatible LAN, which itself is communicatively coupled to the Internet through one or more Internet service provider networks. The precise details of such communication paths are not critical to the present invention. What is important is that computer system 178 can send and receive messages and data through the communication interface and in that way communication with hosts accessible via the Internet. Computer system 176 may include additional capabilities and facilities, such as a power unit, which may comprise a battery, a power port, one or more antennae, one or more data ports, and one or more wireless communication modules. The various databases described herein are computer-based record keeping systems. Stated differently, these databases are each a combination of computer hardware and software that act together to allow for the storage and retrieval of information (data). Accordingly, they may resemble computer system 176, and are often characterized by having storage mediums capable of accommodating significant amounts of information.

Figure 10:
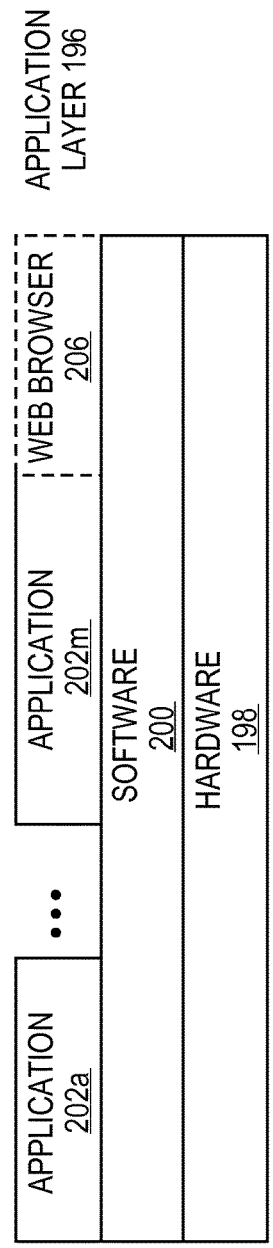
FIG. 10 is an exemplary computer system in accordance with some embodiments of the invention.

FIG. 10 illustrates a computer system 176 from the point of view of its software architecture. Computer system 176 may be any of the electronic devices or, with appropriate applications comprising a software application layer 196, may be a computer system for use with the mapping tool described herein. The various hardware components of computer system 176 are represented as a hardware layer 198. An operating system 20 abstracts the hardware layer and acts as a host for various applications 202a-202m, that run on computer system 176. The operating system may host a web browser application 206, which provides access for the mapping tool, etc.

Thus, methods and systems for converting content created by software tools, for example desktop publishing tools, in formats intended for use with print-based distributions of the content to formats suitable for use in connection with digital distributions of the content have been described.

What is claimed is:

1. A computer-based content editing tool, comprising computer-executable instructions stored on a non-transitory computer-readable medium, which instructions when executed by a processor cause said processor to display a user interface for the content editing tool, said user interface comprising:
    a first panel for displaying markup elements from a content item, the markup elements being elements of the content item delineated by one or more markup language tags;
    one or more tools configured to permit user selection of the markup elements displayed within the first panel;
    a menu of contextually derived predefined markup language patterns available for selection and for which the markup elements of the content item may be mapped to corresponding pattern elements of a selected pattern; and
    a second panel for displaying results of mapping a selected markup element from the content item to a corresponding pattern element of one of the predefined markup language patterns, said mapping being triggered by a user dragging and dropping the selected markup element to the corresponding pattern element of a pattern selected from the menu, and
    wherein said mapping causes the processor to execute further ones of the instructions to identify additional instances of the selected markup element throughout the content item and to process transformations, without need for further user interaction, for each of the additional instances of the selected markup element in accordance with additional ones of the corresponding pattern element of the selected pattern.

2. The computer-based content editing tool of claim 1, wherein in addition to the markup elements, the first panel is configured to display text from the content item.

3. The computer-based content editing tool of claim 1, wherein one or more of the markup elements from the content item are a combination of a hypertext markup language element tag and a name for a tag of a document element within the content item.

4. The computer-based content editing tool of claim 1, wherein presentation of the menu of predefined markup language patterns is dynamic in nature and is triggered by user selection of one of the markup elements to be mapped to one of the predefined patterns.

5. The computer-based content editing tool of claim 1, wherein, responsive to a mapping of a selected one of the markup elements to one of the pattern elements of the predefined patterns, further ones of the instructions cause the processor to display, within the user interface, a list of similar instances of the selected markup element found throughout the content item.

6. The computer-based content editing tool of claim 1, wherein, responsive to a mapping of a selected one of the markup elements to one of the pattern elements of the predefined patterns, further ones of the instructions cause the processor to display, within the user interface, a list of similar instances of a pattern of mapped markup elements found throughout the content item, the pattern defined by the predefined pattern.

* * * * *